United States Patent
Yasumoto et al.

(10) Patent No.: US 7,316,860 B2
(45) Date of Patent: Jan. 8, 2008

(54) POLYMER ELECTROLYTE FUEL CELL AND PRODUCTION METHOD OF THE SAME

(75) Inventors: Eiichi Yasumoto, Kyoto (JP); Akihiko Yoshida, Hirakata (JP); Makoto Uchida, Hirakata (JP); Junji Morita, Moriguchi (JP); Yasushi Sugawara, Higashiosaka (JP); Teruhisa Kanbara, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 285 days.

(21) Appl. No.: 10/372,945

(22) Filed: Feb. 26, 2003

(65) Prior Publication Data

US 2003/0198860 A1    Oct. 23, 2003

Related U.S. Application Data

(63) Continuation-in-part of application No. PCT/JP02/02044, filed on Mar. 5, 2002.

(30) Foreign Application Priority Data

| Mar. 7, 2001 | (JP) | ............................. 2001-063057 |
| Mar. 15, 2001 | (JP) | ............................. 2001-073730 |
| Mar. 23, 2001 | (JP) | ............................. 2001-084770 |

(51) Int. Cl.
H01M 4/90 (2006.01)
H01M 4/86 (2006.01)
(52) U.S. Cl. ......................................... 429/40; 429/42
(58) Field of Classification Search ............ 429/40–42, 429/44, 30
See application file for complete search history.

(56) References Cited

U.S. PATENT DOCUMENTS 3,160,530 A    12/1964    Witherspoon (Continued)

FOREIGN PATENT DOCUMENTS

EP        0 606 051 A1    7/1994

(Continued)

OTHER PUBLICATIONS

Website printout: http://www.2spi.com/catalog/supp/triton-x-100.html; Triton-X 100 Nonionic Surfactant 2005.*

(Continued)

Primary Examiner—Tracy Dove
(74) Attorney, Agent, or Firm—McDermott Will & Emery LLP

(57) ABSTRACT

A polymer electrolyte fuel cell comprising: a hydrogen ion-conductive polymer electrolyte membrane; an anode and a cathode with the electrolyte membrane interposed therebetween; an anode-side conductive separator having a gas flow channel for supply of a fuel gas to the anode; and a cathode-side conductive separator having a gas flow channel for supply of an oxidant gas to the cathode, wherein each of the anode and the cathode comprises at least a catalyst layer in contact with the electrolyte membrane and a gas diffusion layer in contact with the catalyst layer and the separator, and at least one of the anode and the cathode contains a compound represented by the formula (I):

$$R_1-O-\{(C_2H_4O)_n-(C_3H_6O)_m\}-R_2 \qquad (I)$$

where $R_1$ and $R_2$ are independent of each other and each represents a hydrogen atom or an alkyl group having not less than 5 and not more than 15 carbon atoms, n and m are integers which satisfy $0 \leq n \leq 5$, $0 \leq m \leq 5$ and $1 \leq n+m \leq 5$, and when neither n nor m is 0, at least one of the ethylene oxide group and at least one of the propylene oxide group are arranged in a random fashion.

1 Claim, 10 Drawing Sheets

U.S. PATENT DOCUMENTS

| | | | |
|---|---|---|---|
| 5,330,860 A | 7/1994 | Grot et al. | |
| 5,945,231 A | 8/1999 | Narayanan et al. | |
| 6,127,059 A * | 10/2000 | Kato | 429/40 |
| 6,156,449 A | 12/2000 | Zuber et al. | |
| 6,335,112 B1 * | 1/2002 | Asukabe et al. | 429/30 |
| 2003/0008196 A1 * | 1/2003 | Wessel et al. | 429/40 |

FOREIGN PATENT DOCUMENTS

| | | |
|---|---|---|
| GB | 2 316 802 A | 3/1998 |
| JP | 6-36771 | 2/1994 |
| JP | 6-116774 | 4/1994 |
| JP | 7-70782 A | 3/1995 |
| JP | 8-235122 | 9/1996 |
| JP | 8-236123 A | 9/1996 |
| JP | 9-180727 A | 7/1997 |
| JP | 10-92439 | 4/1998 |
| JP | 10-92439 A | 4/1998 |
| JP | 10-334922 | 12/1998 |
| JP | 11-16586 | 1/1999 |
| JP | 11-45733 A | 2/1999 |
| JP | 11-50290 | 2/1999 |
| JP | 11045733 A * | 2/1999 |
| JP | 11-269689 | 10/1999 |
| JP | 11-335886 | 12/1999 |
| JP | 2000-251910 | 9/2000 |
| JP | 2000-340247 | 12/2000 |
| JP | 2001-15137 | 1/2001 |
| JP | 2001256168 | 9/2001 |
| WO | WO 98/52242 | 11/1998 |

OTHER PUBLICATIONS

Supplementary European Search Report issued in corresponding European Patent Application No. EP 02 70 2747, dated Sep. 18, 2006.

* cited by examiner

Catalyst layer C1~C4    Catalyst layer C5

(a)

(b)

POLYMER ELECTROLYTE FUEL CELL AND PRODUCTION METHOD OF THE SAME

This Application is a continuation-in-part of International Application No. PCT/JP02/02044, whose international filing date is Mar. 5, 2002, which in turn claims the benefit of Japanese Application No. 2001-63057, filed Mar. 7, 2001, Japanese Patent Application No. 2001-73730, filed Mar. 15, 2001, and Japanese Patent Application No.2001-84770, filed Mar. 23, 2001, the disclosures of which Applications are incorporated by reference herein. The benefit of the filing and priority dates of the International and Japanese Applications is respectfully requested.

FIELD OF THE INVENTION

The present invention relates to a polymer electrolyte fuel cell which directly uses a gaseous fuel such as a hydrogen gas or a liquid fuel such as methanol, ethanol or dimethyl ether and an oxidant such as air or oxygen, and particularly relates to the electrode thereof.

BACKGROUND OF THE INVENTION

A typical structure of a conventional polymer electrolyte fuel cell will be described:

A fuel cell using a polymer electrolyte generates electric power and heat simultaneously by electrochemical reaction of a fuel gas containing hydrogen with an oxidant gas containing oxygen such as air.

FIG. 1 shows a schematic sectional view of an electrolyte membrane-electrode assembly (MEA) 15 of the polymer electrolyte fuel cell. The MEA comprises a hydrogen ion-conductive polymer electrolyte membrane 11 and a pair of electrodes 14 arranged on both sides of the electrolyte membrane 11. Each of the electrodes comprises a catalyst layer 12 in contact with the electrolyte membrane 11 and a gas diffusion layer 13 in contact with the catalyst layer 12. The catalyst layer 12 is formed from a mixture of the hydrogen ion-conductive polymer electrolyte and carbon particles carrying platinum-group metal catalyst particles thereon.

The electrolyte membrane 11 used in the present invention is a copolymer of perfluorocarbon sulfonic acid and polytetrafluoroethylene (hereinafter referred to as perfluorocarbon sulfonic acid), for example, a Nafion film produced by Du Pont in the US, and the like having the following formula:

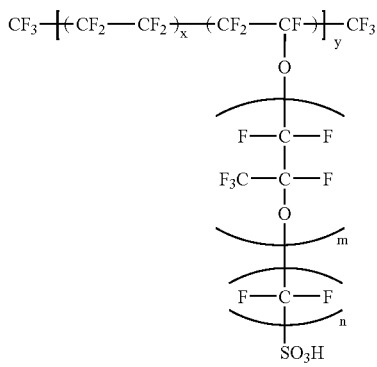

wherein $5 \leq x \leq 13.5$, $y=1000$, $m=1$ and $n=2$.

The gas diffusion layer 13 used is a conductive porous substrate such as carbon paper having gas permeability. The conductive porous substrate may be made water-repellent.

A sealing member such as a gasket is arranged around the electrode 14 with the electrolyte membrane 11. The sealing member is intended to prevent the fuel gas and the oxidant gas for supply to the electrodes from being leaked to the outside or mixed with each other. The sealing member is ted with the MEA.

FIG. 2 shows a schematic sectional view of a unit cell 23 of the polymer electrolyte fuel cell. The unit cell 23 comprises the MEA 15 and a pair of conductive separators 21 arranged on both sides of the MEA. The conductive separator 21 serves to mechanically fix the MEA. On the face of the separator 21 in contact with the MEA 15 formed is a gas flow channel 22 for supplying the fuel gas or the oxidant gas to the electrode and carrying away redundant gas and water produced through an electrode reaction. Although the gas flow channel 22 can be provided independently of the separator 21, a typical process is to arrange a groove in the surface of the separator so as to form the gas flow channel 22. By supplying the fuel gas to one gas flow channel and supplying the oxidant gas to the other gas flow channel, electromotive force of about 0.8 V can be generated out of one unit cell 23.

Normally, plural unit cells 23 are connected in series to obtain a voltage of several volts to several hundreds volts. Therefore, the gas flow channels 22 are formed on both faces of the separator 21, and then the unit cells are connected in series in order: separator/MEA/separator/MEA.

The gas is supplied to the gas flow channel through a manifold. There are two types of manifolds: a manifold connecting several branches of a gas supply pipe directly to the gas flow channel (called an external manifold) and manifold in the form of through holes, arranged through the separator with the gas flow channel and communicating with the inlet and outlet of the gas flow channel (called an internal manifold).

Next, three functions of the gas diffusion layer will be described:

First, the gas diffusion layer has the function of diffusing the gas in order to supply the fuel gas or the oxidant gas uniformly to the catalyst particles in the catalyst layer.

Secondly, the gas diffusion layer has the function of promptly carrying away water produced in the catalyst layer into the gas flow channel.

Thirdly, the gas diffusion layer has the function of conducting electrons involved in the reaction.

The gas diffusion layer is required to have excellent gas permeability, steam permeability and conductivity Conventionally, therefore, the gas diffusion layer has been made from a conductive porous substrate with pores developed therein such as carbon paper, carbon cloth or carbon felt in order to secure the gas permeability. The steam permeability is secured by dispersing water-repellent polymers in the gas diffusion layer. Further, the conductivity is secured by using a conductive material such as carbon fiber, metal fiber or a carbon fine powder for the gas diffusion layer.

Next, four functions of the catalyst layer will be described:

First, the catalyst layer has the function of supplying the fuel gas or the oxidant gas supplied from the gas diffusion layer to a reaction site.

Secondly, the catalyst layer has the function of promptly conducting hydrogen ions involved in the reaction to the electrolyte membrane.

Thirdly, the catalyst layer has the function of conducting electrons involved in the reaction.

Fourthly, the catalyst layer has the function of promptly advancing a redox reaction by providing a large reaction area and a highly-active catalyst.

The catalyst layer is required to have excellent gas permeability, hydrogen ion permeability and conductivity, but also to provide an excellent reaction site for the reaction. Conventionally, therefore, the gas permeability is secured by forming a catalyst layer precursor from a mixture of a pore-producing agent and carbon particles with pores developed therein, and removing the pore-producing agent. The hydrogen ion permeability is secured by dispersing the polymer electrolyte in the vicinity of the catalyst particles to form a hydrogen ion-conductive network. Further, the conductivity is secured by forming a catalyst carrier from a conductive material such as carbon particles or carbon fiber. Moreover, by making several-nm-size fine catalyst particles comprising a platinum-group metal on a carrier, the dispersibility of the catalyst particles in the catalyst layer are enhanced, enabling provision of a favorable reaction site.

The following problems exist concerning the electrode of the conventional fuel cell:

First, there is a problem that the gas permeability, steam permeability and conductivity of the electrode are properties mutually contradictory. For example, when the gas diffusion layer is made of carbon fiber with a small diameter or the porosity of the gas diffusion layer is increased in order to enhance the gas permeability of the electrode, the conductivity of the gas diffusion layer decreases. When the water-repellent polymers are added to the gas diffusion layer in order to enhance the steam permeability, the gas permeability and conductivity of the gas diffusion layer decrease. Thus, there is a need to make the mutually contradictory properties compatible by forming the gas diffusion layer, not from a single material, but from a combination of a layer comprising the carbon fiber and a layer comprising the carbon particles and the water-repellent polymers. Also it has been proposed to use of a surfactant to obtain a favorable dispersed state of the carbon particles and the water-repellent polymers. For example, the conventional process for producing the gas diffusion layer comprises the steps of preparing a water-repellent ink which includes carbon particles, water-repellent polymers, a surfactant and a dispersion medium and applying the water-repellent ink to the conductive porous substrate has been studied. There are, however, few examples of detailed studies regarding the effect of the surfactant.

Japanese Laid-Open Patent Publication No. Hei 11-335886, Japanese Laid-Open Patent Publication No. Hei 11-269689, Japanese Laid-Open Patent Publication No. Hei 11-50290, Japanese Laid-Open Patent Publication No. Hei 10-092439 and Japanese Laid-Open Patent Publication No. Hei 6-116774 disclose octyl phenol ethoxylate belonging to alkylphenol group as the surfactant for dispersing the water-repellent polymers in the water-repellent ink. Further, Japanese Laid-Open Patent Publication No. Hei 6-036771 discloses: anionic surfactants such as fatty acid soap, alkylbenzene sulfonate, alkylaryl sulfonate and alkylnaphthalene sulfonate; cationic surfactants such as alkylamine salt, amide-bonded amide salt, ester-bonded amine salt, alkylammonium salt, amide-bonded ammonium salt, ester-bonded ammonium salt, ether-bonded ammonium salt, alkylpyridinium salt and ester-bonded pyridinium salt; amphoteric surfactants such as a long-chain alkylamino acid; and nonionic surfactants such as alkyl aryl ether, alkyl ether, alkylamine fatty acid glyceric ester, anhydro sorbitol fatty acid ester, polyethylene imine and fatty acid alkylolamide. In the examples of the above documents, however, only octyl phenol ethoxylate belonging to alkylphenol was studied. Therefore, the above documents simply introduce a variety of common surfactants extensively, and effects of these surfactants when used for an electrode of a fuel cell are unclear.

Surfactants of alkylphenol group are environmental hormones suspected of having the endocrine-disrupting function. For this reason, such surfactants raise a safety issue, safety of the production of the electrode and the MEA, safety of a final product in a case where a trace quantity of alkylphenol is left, and safety in waste disposal of the final product. In order to reduce these safety hazzard, extraction of the surfactant by solvent is necessary. However, this extraction requires liquid waste disposal, a scrubber and the like, thereby raising a problem of increased cost.

Meanwhile, when no surfactant is used, the following problem may arise. First, the water-repellent polymers do not sufficiently disperse and are unevenly distributed in the electrode, making it impossible to control the water content of the electrode and to secure sufficient electrode strength. Second, since stability of the water-repellent ink decreases, the solid matter concentration thereof does not become uniform and a pipe or a pump of an applying apparatus is clogged with the water-repellent ink in the production process of the gas diffusion layer. As a result, variation or defect of a coating of the water-repellent ink occurs, causing the discharge performance of the electrode to deteriorate.

Next, there is a problem with the electrode of the conventional fuel cell that the water content increases with the passage of time. This is because water is produced through the electrode reaction, and further, the reaction gas contains water for humidification. When the water content of the catalyst layer and the gas diffusion layer increase, micropores as gas channels become clogged, which causes insufficient supply of the gases to the electrodes, leading to deterioration in cell performance. On the other hand, when the humidity of the gas is decreased or humidification is suspended for a long time, the water content of the polymer electrolyte and the electrolyte membrane in the MEA decrease to cause the hydrogen ion-conductive network to deteriorate, leading to deterioration in cell performance. The cause of such a phenomenon lies in the difficulty of controlling the water content of the electrode due to insufficient moisture retention of the conventionally-used electrode.

For this reason, Japanese Laid-Open Patent Publication No. Hei 10-334922 proposes making a moisture retentive agent comprising sulfuric acid or phosphoric acid contained in the catalyst layer. Since sulfuric acid and phosphoric acid are apt to vaporize, control of the water content is difficult. Further, the use of sulfuric acid or phosphoric acid may raise a further problem, corrosion of the structural members of the fuel cell system. Moreover, Japanese Laid-Open Patent Publication No. 2000-251910, Japanese Laid-Open Patent Publication No. 2001-15137, Japanese Examined Patent Publication No. Hei 10-52242 and Japanese Laid-Open Patent Publication No. 2000-340247 disclose a means of controlling the water content of the catalyst layer and the gas diffusion layer from the outside of the electrode or the catalyst layer by the use of a polymer water-absorptive sheet. However, it is not possible to control local water content of the catalyst layer and the gas diffusion layer in the method for controlling the water content of the catalyst layer and the gas diffusion layer from the outside.

Next, there is another problem with the electrode of the conventional fuel cell and that is it is difficult to produce a catalyst layer with catalyst particles evenly distributed therein. The catalyst layer is required to simultaneously have high gas diffusibility, conductivity, catalyst activity and hydrogen ion permeability. To satisfy this requirement, it is necessary to evenly distribute the catalyst particles along the plane of the catalyst layer.

A typical catalyst layer is formed by applying the catalyst ink. Examples of the applying method may include a screen-printing method, a spraying method, a gravure-printing method and a coater method. The catalyst ink is prepared by mixing carbon particles carrying catalyst particles thereon, a hydrogen ion-conductive polymer electrolyte and a dispersion medium such as water or alcohol. It is common that the catalyst ink is further mixed with a thickener for facilitating the application.

Generally, the viscosity of the catalyst ink is measured by a single shear rate, and in the field of the catalyst ink of the fuel cell. There have been few detailed studies on thixotropy conducted by changing the shear rate.

In Japanese Laid-Open Patent Publication No. Hei 8-235122, thickeners with a high viscosity such as fluorine-atom-containing alcohols are used to control the catalyst ink's viscosity. Further, there also is a method in which a thickener with a high viscosity such as glycerol is used. Since the thickener needs to be removed from the catalyst layer, the use of the thickener necessitates heating of the catalyst layer at high temperature after the formation thereof Problems may hence arise in that the hydrogen ion-conductive polymer electrolyte in the catalyst ink deteriorates and that the production cost of the electrode increases due to a high heating temperature of 100° C. or higher.

As indicated in Japanese Laid-Open Patent Publication No. Hei 11-16586, there is another method in which catalyst ink is prepared with no thickener added thereto and the viscosity of the obtained catalyst ink is adjusted by heating. In this method, however, it is difficult to control the amount of evaporating dispersion medium, and thus it is not easy to adjust the viscosity. Moreover, a problem may arise that the hydrogen ion-conductive polymer electrolyte in the catalyst ink denatures or agglomerates in heating.

SUMMARY OF THE INVENTION

It is an object of the present invention to enhance safety of a product and a production process of a fuel cell and also to decrease variation and defect of a coating of water-repellent ink in the production process by optimizing a surfactant for improving dispersibility of water-repellent polymers in a gas diffusion layer of an electrode of a fuel cell.

It is another object of the present invention to further enhance cell performance by optimizing the water content of the electrode of the fuel cell.

It is still another object of the present invention to obtain a fuel cell having a catalyst layer with catalyst particles evenly distributed along the plane thereof by controlling viscosity of the catalyst ink by means of a solid matter concentration, without using a thickener nor heating.

The present invention relates to a polymer electrolyte fuel cell comprising: a hydrogen ion-conductive polymer electrolyte membrane; an anode and a cathode with the electrolyte membrane interposed therebetween; an anode-side conductive separator having a gas flow channel for supply of a fuel gas to the anode; and a cathode-side conductive separator having a gas flow channel for supply of an oxidant gas to the cathode, wherein each of the anode and the cathode comprises at least a catalyst layer in contact with the electrolyte membrane and a gas diffusion layer in contact with the catalyst layer and the separator, and at least one of the anode and the cathode contains a compound represented by the formula (I):

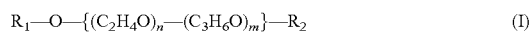

where $R_1$ and $R_2$ are independent of each other and each represent a hydrogen atom or an alkyl group having not less than 5 and not more than 15 carbon atoms, n and m are integers which satisfy $0 \leq n \leq 5$, $0 \leq m \leq 5$ and $1 \leq n+m \leq 5$, and when neither n norm is 0, at least one of the ethylene oxide group and at least one of the propylene oxide group are arranged in a random fashion.

It is preferable that at least one of the anode and the cathode further comprises at least one oxide containing at least one metal selected from the group consisting of silicon, titanium, aluminum, zirconium, magnesium and chromium.

It is preferable that at least one of the anode and the cathode contains the metal oxide in an amount of 1 to 10,000 ppm.

The present invention also relates to a production method of a polymer electrolyte fuel cell comprising: (a) preparing a water-repellent ink including carbon particles, carbon fiber or mixtures thereof, a water-repellent polymer; a surfactant; and a dispersion medium; (b) preparing a catalyst ink including carbon particles carrying catalyst particles thereon, a hydrogen ion-conductive polymer electrolyte and a dispersion medium; (c) applying the water-repellent ink onto a conductive porous substrate and evaporating the dispersion medium in the water-repellent ink to form a gas diffusion layer; (d) forming a catalyst layer with the catalyst ink; and (e) assembling a unit cell by assembling the gas diffusion layer, the catalyst layer and a hydrogen ion-conductive polymer electrolyte membrane, wherein the surfactant used in step (a) comprises a compound represented by the formula (I):

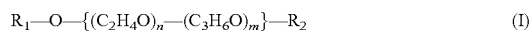

where $R_1$ and $R_2$ are independent of each other and each represent a hydrogen atom or an alkyl group having not less than 5 and not more than 15 carbon atom, n and m are integers which satisfy $0 \leq n \leq 5$, $0 \leq m \leq 5$ and $1 \leq n+m \leq 5$, and when neither n nor m is 0, at least one of the ethylene oxide group and at least one of the propylene oxide group are arranged in a random fashion; wherein the catalyst ink is a Non-Newtonian liquid having a viscosity of not less than 10 Pa·s at a shear rate of 0.1 (1/sec) and a viscosity of not more than 1 Pa·s at a shear rate of 100 (1/sec).

It is preferable that step (d) of the process comprises a step of evaporating the dispersion medium out of a coating formed with the catalyst ink at a temperature of not lower than 40° C. and not higher than 100° C.

It is preferable that the weight ratio of the catalyst particles, the carbon particles and the polymer electrolyte contained in the catalyst ink is substantially 1:1:1.

DETAILED DESCRIPTION OF THE INVENTION

Figure 1:
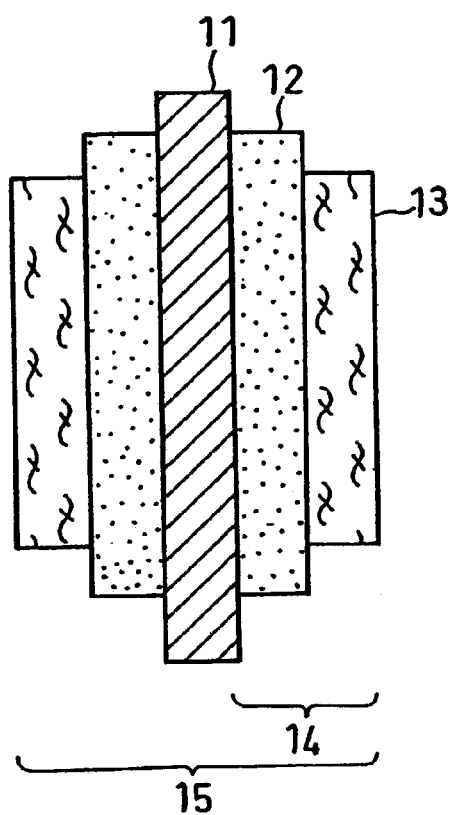
FIG. 1 is a schematic sectional view of an MEA of a polymer electrolyte fuel cell.
Figure 2:
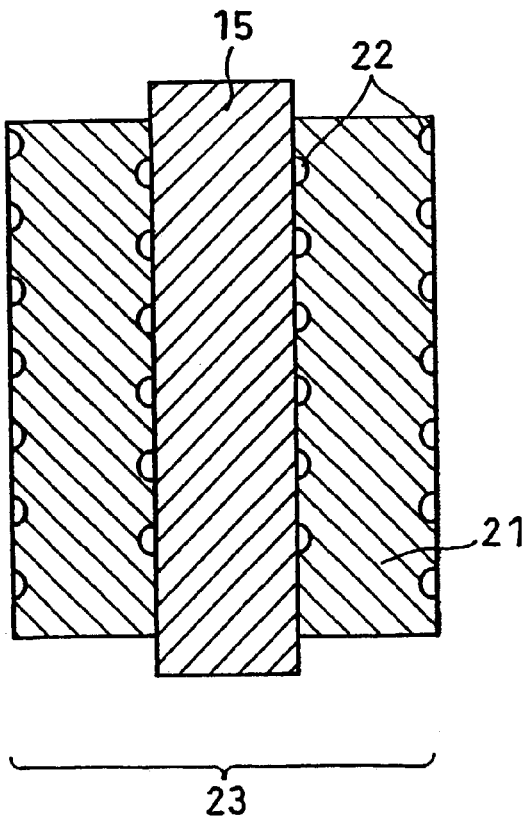
FIG. 2 is a schematic sectional view of a unit cell of the polymer electrolyte fuel cell.

A polymer electrolyte fuel cell of the present invention comprises: a hydrogen ion-conductive polymer electrolyte membrane; an anode and a cathode with the electrolyte membrane interposed therebetween; an anode-side conductive separator having a gas flow channel for supply of a fuel gas to the anode; and a cathode-side conductive separator having a gas flow channel for supply of an oxidant gas to the cathode.

Each of the anode and the cathode comprises a catalyst layer in contact with the electrolyte membrane and a gas diffusion layer in contact with the catalyst layer and the separator.

At least one of the anode and the cathode contains an alkylene oxide compound represented by the formula (I):

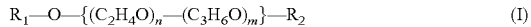

$$R_1-O-\{(C_2H_4O)_n-(C_3H_6O)_m\}-R_2 \qquad (I)$$

where $R_1$ and $R_2$ are independent of each other and each represent a hydrogen atom or an alkyl group having not less than 5 and not more than 15 carbon atoms, where n and m are integers which satisfy $0 \leq n \leq 5$, $0 \leq m \leq 5$ and $1 \leq n+m \leq 5$, and when neither n nor m is 0, at least one ethylene oxide group and at least one propylene oxide group are arranged in a random fashion.

The alkylene oxide compound contributes to the dispersion of a water-repellent polymer contained in the gas diffusion layer of at least one of the electrodes. The alkylene oxide compound also contributes to the dispersion of a binder which may be included in at least one of the electrodes. The alkylene oxide compound does not have the disrupting endocrine function. Moreover, an electrode using this compound has excellent current-voltage characteristics for the following reasons:

The gas diffusion layer is produced by applying a water-repellent ink containing a water-repellent polymer and carbon particles and/or carbon fibers onto a conductive porous substrate such as carbon paper or carbon felt. When the alkylene oxide compound as a surfactant is contained in the water-repellent ink, the water-repellent polymer and the carbon particles sufficiently disperse in the ink and are thus not unevenly distributed therein, thereby implementing advanced control of the water content of the electrode and also to securing sufficient electrode strength. Further, since the water-repellent polymer is not unevenly distributed in the ink, the stability of the water-repellent ink is increased. As a result, there are fewer instances where a pipe, a pump or the like is clogged with the solid matter of the ink in such processes as applying and printing and where the physical properties of the ink change, resulting in a decrease in variation or defect of the coating.

It is preferable that the water-repellent polymer be contained in the water-repellent ink in an amount of 5 to 40 parts by weight per 100 parts by weight of carbon material such as carbon particles, carbon fiber or mixtures thereof The water-repellent polymer preferably used is a fluorocarbon resin such as polytetrafluoroethylene (hereinafter referred to as PTFE) or a tetrafluoroethylene-hexafluoropropylene copolymer.

It is preferable that the alkylene oxide compound be contained in the water-repellent ink in an amount of 1 to 20 parts by weight per 100 parts by weight of the carbon material.

It is preferable that the water-repellent ink be applied onto the conductive porous substrate at a rate of 5 to 40 $g/m^2$.

Among the surfactants conventionally in wide use are substances suspected as having the endocrine-disrupting function such as alkylphenols. These substances have a phenol group in the molecule. On the other hand, the alkylene oxide compound used in the present invention includes neither the phenol group nor has the endocrine-disrupting function. According to the present invention, therefore, the water-repellent ink is safer and the gas diffusion layer is improved. Further, in the case of using a surfactant that is likely to have an endocrine-disrupting function, an extraction treatment of the surfactant by solvent, liquid waste disposal, a scrubber and the like are required for the purpose of securing safety; as opposed to this, according to the present invention, such treatments and an apparatus are unnecessary. It is thereby possible to reduce production cost. Moreover, since there is no fear of a trace quantity of residual environmental hormone in a final product, safety of the product can be secured and hence special waste disposal becomes unnecessary.

It is preferable for optimization of the wet condition of the electrode that the anode and/or cathode further comprises an oxide containing at least one metal selected from the group consisting of silicon, titanium, aluminum, zirconium, magnesium and chromium. The oxide may be a composite oxide containing plural metals. Further, one oxide may be used singly or plural oxides may be used in combination.

It is preferable that the anode and/or cathode contain the metal oxide in an amount of 1 to 10,000 ppm.

Since the oxide has water retentivity, the wet condition of the electrode can be controlled by dispersing the particles of the oxide within micropores in the catalyst layer and the gas diffusion layer. Namely, because the oxide absorbs redundant water, such a phenomenon is inhibited as the pores serving as the gas flow channels in the catalyst layer and the gas diffusion layer are clogged with a steam added to a reaction gas or water produced through the electrode reaction. Meanwhile, even when the water content of the reaction gas is lowered or humidification of the gas is suspended for a long time, a decrease in hydrogen ion-conductivity is inhibited due to supply of water from the metal oxide to the polymer electrolyte and the electrolyte membrane in the electrode. Thus, the fuel cell is capable of exerting high performance for a long time.

Furthermore, differently from the conventional method for controlling the wet condition of the electrode by the use of the conventional sheet comprising water-absorbing polymers, the aforesaid oxide enables control of the wet condition in the local area of the electrode. Accordingly, partial dryness of the electrode, or the like, can be prevented, which thus allows a high gas diffusibility and hydrogen ion-conductivity of the electrode to be kept over a long period of time.

The metal oxide can be made of finer particles than those of conventionally-used polymers such as polyamide, cotton, polyester/regenerated cellulose, polyester/acrylate, regenerated cellulose/polychlal and sodium polyacrylate. It is therefore possible to effectively disperse the oxide particles within the micropores in the catalyst layer and the gas diffusion layer. For example, the oxide particles can be arranged in the vicinity of the polymer electrolyte requiring humidification in contact with the catalyst particles. Further, since the oxide particles can also be arranged in the vicinity of the pores inside the electrode which functions as flow channels of the reaction gas, redundant water is absorbed into the oxide particles. Thereby, the clogging of the gas flow channel can be prevented.

Because oxides such as silica, titania, alumina, zirconia, magnesia and chromia are chemically very stable. They do not dissolve in the dispersion medium like the polymer particles and are resistant to the dispersion medium used in production of the electrode. Further, in a heat treatment for removing the dispersion medium and the surfactant, when the oxide is used, a treatment can be at high temperature of 300° C. or higher. On the other hand, when the polymer particles are used, a treatment can be at low temperatures thereby preventing the polymers from being neither altered nor decomposed.

It should be noted that, when the oxide is added to the catalyst layer, a predetermined amount of oxide may be added to the catalyst ink in advance. When the oxide is added to the gas diffusion layer, a predetermined amount of oxide may be added to the water-repellent ink in advance.

As thus described, an oxide having water retentivity is most suitable for controlling the wet condition of the electrode at the microlevel, and furthermore, the use of the oxide widens a range of conditions in the production process.

A production method of a fuel cell of the present invention is described below:

First, a description will be given to viscosities of liquids by reference to "Rheology Guide", written and edited by Shoten Oka. A typical liquid has a constant viscosity regardless of the shear rate thereof, as long as the temperature thereof is kept at constant. Such a liquid is called a Newtonian fluid. As opposed to this, a liquid whose viscosity changes as the shear rate thereof changes even with the temperature thereof kept at constant is called a Non-Newtonian fluid.

Figure 3:
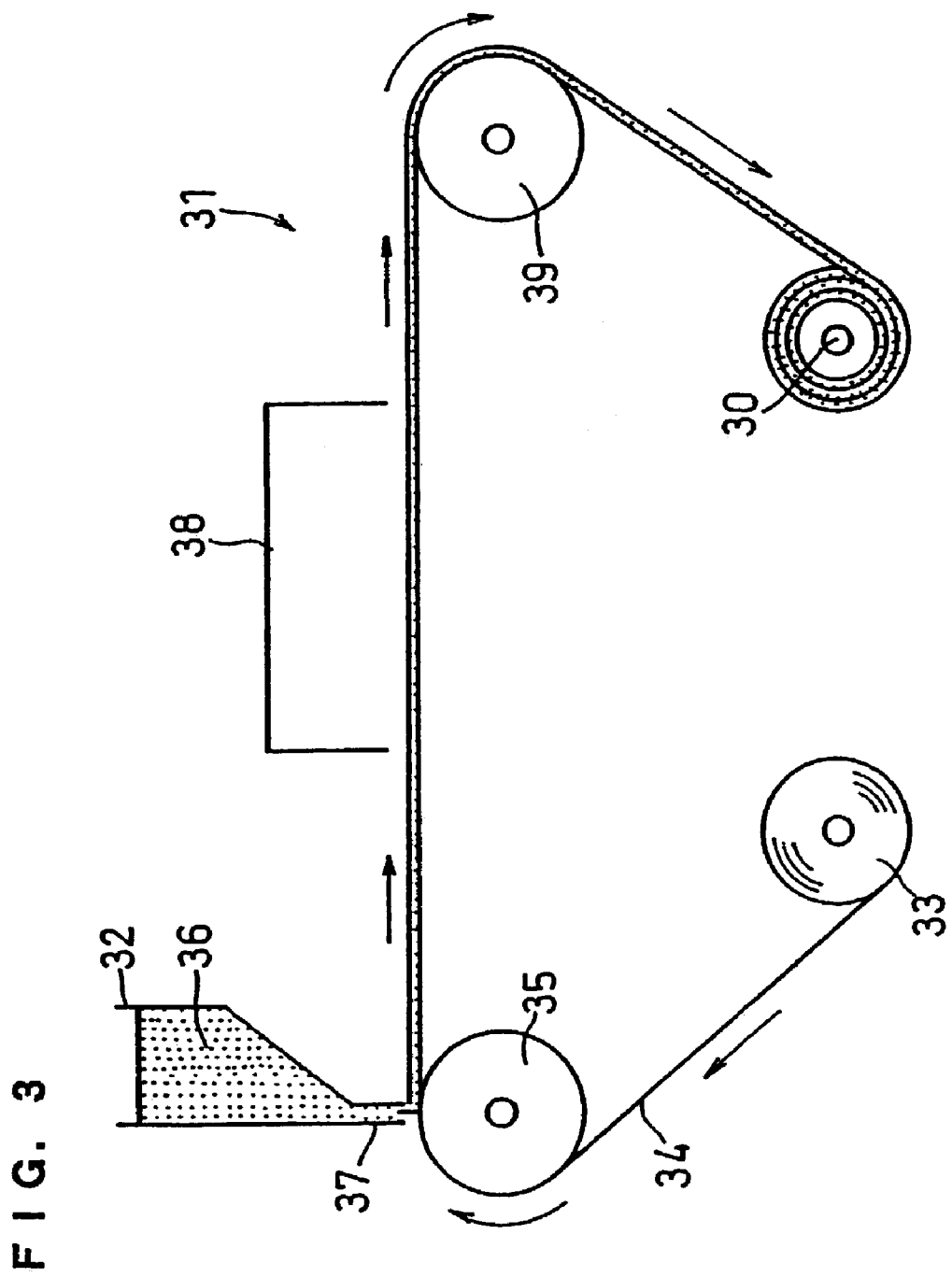
FIG. 3 is a pattern view of an applying apparatus for use in the present invention.

Next, a description will be given to the viscosity of the catalyst ink by taking as an example the case of applying a catalyst ink 36 onto a substrate 34 with the use of an applying apparatus 31 as shown in FIG. 3. The catalyst ink 36 is put into a tank 32 and is applied through nozzle 37 and applying roll 35 onto the substrate 34 of the gas diffusion layer or the polymer electrolyte membrane. The substrate 34 is supplied from a wind-off part 33. The coating formed on the substrate 34 passes through a drying room 38 and a guide roll 39 to be taken up by a wind-up part 30.

In a case where the catalyst ink 36 is the Newtonian fluid, when the viscosity of the ink is excessively low, the ink drips in applying or the coating extends too much in the width direction thereof, making it difficult to form an even catalyst layer. On the other hand, when the viscosity of the catalyst ink 36 is excessively high, the tip of the nozzle 37 is clogged with the ink or the coating obtained is uneven or streaks, making it difficult to form an even catalyst layer.

However, when the catalyst layer is the Non-Newtonian fluid, because the catalyst ink 36 passes through a very narrow clearance near the tip of the nozzle 37, the shear rate becomes higher and the viscosity of the ink becomes lower, whereby the ink flows easier. Further, because the shear rate of the ink after the application thereof onto the substrate 34 is very small, the viscosity of the ink increases. Thus, a stable coating is formed on the substrate 34 without the coating dripping or extending in the width direction thereof.

Accordingly, by using the catalyst ink of the thixotropic Non-Newtonian fluid whose viscosity is low at a high shear rate and high at a low shear rate, instead of using the Newtonian fluid, a stable catalyst layer can be formed.

From the aforesaid viewpoint, in the present invention, a catalyst ink of a Non-Newtonian liquid is prepared having a viscosity of not less than 10 Pa·s at a shear rate of 0.1 (1/sec) and a viscosity of not more than 1 Pa·s at a shear rate of 100 (1/sec). The Non-Newtonian liquid catalyst ink comprises carbon particles carrying catalyst particles thereon, a hydrogen ion-conductive polymer electrolyte and a dispersion medium.

When the catalyst ink satisfies the above condition, the shear rate at the tip of the nozzle 37 is high. The viscosity of the catalyst ink 36 decreases and a coating having an even thickness is thus formed. Moreover, the coating of the ink after the application thereof onto the substrate 34 where shear is not applied, the viscosity increases, and the coating neither drips nor extends in the width direction thereof.

It is preferable that the catalyst ink be produced from a mixture comprising a carbon particles carrying catalyst particles thereon, a hydrogen ion-conductive polymer electrolyte and a dispersion medium with the use of a stirring or mixing machine having grinding/dispersing means such as a bead mill or a ball mill.

The shear rate of the catalyst ink can be controlled, for example, by changing the rate of the solid matter content of the catalyst ink to the dispersion medium. The shear rate can also be controlled by changing the composition of the solid matter. For example, it is preferable that the catalyst ink contains 1 to 10 wt % of the catalyst particles (e.g., platinum-group metal), 1 to 10 wt % of carbon particles as a carrier of the catalyst particles, and 1 to 10 wt % of the polymer electrolyte. It is most preferable that the weight ratio of the catalyst particles, the carbon particles and the polymer electrolyte in the catalyst ink be substantially 1:1:1.

The catalyst ink is applied onto a substrate such as a hydrogen ion-conductive polymer electrolyte membrane or the gas diffusion layer, and then the dispersion medium in the catalyst ink is evaporated to form a catalyst layer. It is preferable that the step for evaporating the dispersion medium is conducted at a temperature of not lower than 40° C. and not higher than 100° C., from the viewpoint of preventing the hydrogen ion-conductive polymer in the catalyst layer from degenerating and the coating from cracking.

EXAMPLE 1

(i) Production of Gas Diffusion Layer 100 parts by weight of acetylene black as conductive carbon particles (Denka black with a particle size of 35 nm, produced by DENKI KAGAKU KOGYO KABUSHIKI KAISHA), 10 parts by weight of alkylene oxide type surfactant represented by the following formula:

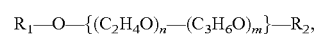

and a PTFE aqueous dispersion (D-1E, produced by DAIKIN INDUSTRIES, LTD.) containing 20 parts by weight of PTFE were mixed to prepare a water-repellent ink. $R_1$, $R_2$, n and m in the formula are set forth in Tables 1-13 below.

Next, the water-repellent ink was applied onto the surface of carbon paper (TGPH060H with a porosity of 75% and a thickness of 180 μm, produced by Toray Industries, Inc.) as a substrate of a gas diffusion layer at a rate of 30 g/m² so that the water-repellent ink was impregnated in the carbon paper. The carbon paper with the water-repellent ink impregnated therein was then placed in an air atmosphere, which was heat-treated at 350° C. with a hot air dryer to produce a gas diffusion layer.

(ii) Formation of Catalyst Layer (ii-1) Cathode Side 50 parts by weight of platinum particles having a mean particle size of about 30 angstroms are carried on 100 parts by weight of conductive carbon particles (Ketjen black EC, produced by AKZO Chermie in Holland) having a mean primary particle size of 30 nm. The carbon particles carrying the platinum particles thereon were then mixed with an alcohol dispersion containing 9 wt % of hydrogen ion-conductive polymer electrolyte to prepare a catalyst ink for the cathode side. Herein, the carbon particles carrying the platinum particles thereon were mixed with the dispersion of the hydrogen ion-conductive polymer electrolyte in a weight ratio of 4:96. The hydrogen ion-conductive polymer electrolyte used was perfluorocarbon sulfonic acid (Flemion, produced by Asahi Glass Co., Ltd).

Subsequently, the catalyst ink for the cathode side was printed on one face of the gas diffusion layer and on one face of a hydrogen ion-conductive polymer electrolyte membrane (Nafion 112, produced by Du Pont in the US) which was a size larger than the gas diffusion layer, and then dried at 70° C. to each form a cathode-side catalyst layer with a thickness of 10 μm.

(ii-2) Anode Side 25 parts by weight each of platinum particles and ruthenium particles, both having a mean particle size of about 30 angstroms were carried on on 100 parts by weight of Ketjen black EC carbon particles. The carbon particles carrying the platinum particles and ruthenium particles thereon were then mixed with an alcohol dispersion containing 9 wt % of hydrogen ion-conductive polymer electrolyte to prepare a catalyst ink for the anode side. The carbon particles carrying the platinum particles and the ruthenium particles thereon were mixed with the dispersion of the hydrogen ion-conductive polymer electrolyte in a weight ratio of 4:96. The hydrogen ion-conductive polymer electrolyte used was perfluorocarbon sulfonic acid (Flemion, produced by Asahi Glass Co., Ltd).

The catalyst ink for the anode side was then printed on the other face of the gas diffusion layer and on the other face of the hydrogen ion-conductive polymer electrolyte membrane, and then dried at 70° C. to each form an anode-side catalyst layer with a thickness of 15 μm.

(iii) Production of MEA

The cathode-side catalyst layers and the anode-side catalyst layers were mutually opposed. The hydrogen ion-conductive polymer electrolyte membrane having the catalyst layers on both sides thereof was interposed between the gas diffusion layers, each layer having the catalyst layer on one side thereof, and then hot pressed to produce an MEA. This is referred to as MEA-1.

(iv) Assembly of Fuel Cell

A rubber gasket was bonded to the periphery of the electrolyte membrane of MEA-1 and manifold holes for passage of cooling water, a fuel gas and an oxidant gas were formed therethrough.

Meanwhile, a variety of separators made of phenol resin-impregnated graphite plate with an external size of 20 cm×32 cm, a thickness of 1.3 mm and a depth of the gas flow channel or cooling water channel thereon of 0.5 mm were prepared.

The gas flow channel side of a separator with an oxidant gas flow channel was on the cathode side of MEA-1, while the gas flow channel side of a separator with a fuel gas flow channel was on the anode side of MEA-1, so that the whole was integrated to constitute a unit cell.

Subsequently, two unit cells were stacked and then interposed between a pair of separators with cooling water flow channels formed thereon such that the cooling water flow channel sides of the separators were directed inwardly This pattern was repeated to produce a cell stack of 100 cells. A current collector plate made of stainless steel and an insulating plate made of an electrically-insulating material were arranged on both ends of the cell stack, and further, with the use of end plates and tie rods, the whole was fixed. The clamping pressure per area of the separator was 15 kgf/cm². The cell thus produced was referred to as Cell 1.

(v) Evaluation Test

A pure hydrogen gas and air were supplied to the anode and the cathode of Cell 1, respectively, and at a cell temperature of 75° C. and under conditions of a fuel gas utilization rate (Uf) of 70% and an air utilization rate (Uo) of 40%, a discharge test was conducted on the cell. The gases were humidified by passage of the pure hydrogen gas through a bubbler at 60° to 70° C. and by passage of the air through a bubbler at 45° to 70° C.

The relationship between the parameters $R^1$, $R^2$, m and n in the formula of the surfactant used for Cell 1 and the cell voltages of Cell 1 at a current density of 0.2 mA/cm² are shown in the following Tables 1 to 13:

TABLE 1

| $R_1$* or H | $R_2$** | n | m | E*** |
|---|---|---|---|---|
| 4 | 4 | 1 | 0 | 430 |
|   | 5 |   |   | 450 |
|   | 15 |   |   | 320 |
|   | 16 |   |   | 110 |
| 5 | 4 |   |   | 500 |
|   | 5 |   |   | 761 |
|   | 15 |   |   | 783 |
|   | 16 |   |   | 451 |
| 15 | 4 |   |   | 452 |
|   | 5 |   |   | 772 |
|   | 15 |   |   | 789 |
|   | 16 |   |   | 432 |
| 16 | 4 |   |   | 320 |
|   | 5 |   |   | 411 |
|   | 15 |   |   | 489 |
|   | 16 |   |   | 310 |
| H | 4 |   |   | 110 |

TABLE 1-continued

| $R_1$* or H | $R_2$** | n | m | E*** |
|---|---|---|---|---|
|  | 5 |  |  | 775 |
|  | 15 |  |  | 792 |
|  | 16 |  |  | 325 |
| 4 | 4 | 2 | 0 | 431 |
|  | 5 |  |  | 455 |
|  | 15 |  |  | 310 |
|  | 16 |  |  | 150 |
| 5 | 4 |  |  | 502 |
|  | 5 |  |  | 741 |
|  | 15 |  |  | 783 |
|  | 16 |  |  | 458 |
| 15 | 4 |  |  | 412 |
|  | 5 |  |  | 782 |
|  | 15 |  |  | 779 |
|  | 16 |  |  | 482 |
| 16 | 4 |  |  | 330 |
|  | 5 |  |  | 401 |
|  | 15 |  |  | 479 |
|  | 16 |  |  | 300 |
| H | 4 |  |  | 170 |
|  | 5 |  |  | 785 |
|  | 15 |  |  | 742 |
|  | 16 |  |  | 305 |

$R_1$*: Number of carbon atoms in $R_1$
$R_2$**: Number of carbon atoms in $R_2$
E***: Cell voltage

TABLE 2

| $R_1$* or H | $R_2$** | n | m | E*** |
|---|---|---|---|---|
| 4 | 4 | 3 | 0 | 320 |
|  | 5 |  |  | 321 |
|  | 15 |  |  | 110 |
|  | 16 |  |  | 115 |
| 5 | 4 |  |  | 450 |
|  | 5 |  |  | 772 |
|  | 15 |  |  | 755 |
|  | 16 |  |  | 320 |
| 15 | 4 |  |  | 210 |
|  | 5 |  |  | 786 |
|  | 15 |  |  | 750 |
|  | 16 |  |  | 455 |
| 16 | 4 |  |  | 325 |
|  | 5 |  |  | 321 |
|  | 15 |  |  | 441 |
|  | 16 |  |  | 120 |
| H | 4 |  |  | 150 |
|  | 5 |  |  | 758 |
|  | 15 |  |  | 786 |
|  | 16 |  |  | 450 |
| 4 | 4 | 4 | 0 | 401 |
|  | 5 |  |  | 321 |
|  | 15 |  |  | 220 |
|  | 16 |  |  | 149 |
| 5 | 4 |  |  | 420 |
|  | 5 |  |  | 765 |
|  | 15 |  |  | 772 |
|  | 16 |  |  | 325 |
| 15 | 4 |  |  | 402 |
|  | 5 |  |  | 758 |
|  | 15 |  |  | 754 |
|  | 16 |  |  | 452 |
| 16 | 4 |  |  | 369 |
|  | 5 |  |  | 485 |
|  | 15 |  |  | 481 |
|  | 16 |  |  | 210 |

TABLE 2-continued

| $R_1$* or H | $R_2$** | n | m | E*** |
|---|---|---|---|---|
| H | 4 |  |  | 189 |
|  | 5 |  |  | 756 |
|  | 15 |  |  | 774 |
|  | 16 |  |  | 298 |

$R_1$*: Number of carbon atoms in $R_1$
$R_2$**: Number of carbon atoms in $R_2$
E***: Cell voltage

TABLE 3

| $R_1$* or H | $R_2$** | n | m | E*** |
|---|---|---|---|---|
| 4 | 4 | 5 | 0 | 325 |
|  | 5 |  |  | 441 |
|  | 15 |  |  | 241 |
|  | 16 |  |  | 251 |
| 5 | 4 |  |  | 450 |
|  | 5 |  |  | 784 |
|  | 15 |  |  | 774 |
|  | 16 |  |  | 362 |
| 15 | 4 |  |  | 421 |
|  | 5 |  |  | 756 |
|  | 15 |  |  | 781 |
|  | 16 |  |  | 402 |
| 16 | 4 |  |  | 311 |
|  | 5 |  |  | 328 |
|  | 15 |  |  | 441 |
|  | 16 |  |  | 325 |
| H | 4 |  |  | 140 |
|  | 5 |  |  | 781 |
|  | 15 |  |  | 756 |
|  | 16 |  |  | 362 |
| 4 | 4 | 6 | 0 | 251 |
|  | 5 |  |  | 455 |
|  | 15 |  |  | 120 |
|  | 16 |  |  | 100 |
| 5 | 4 |  |  | 150 |
|  | 5 |  |  | 150 |
|  | 15 |  |  | 240 |
|  | 16 |  |  | 320 |
| 15 | 4 |  |  | 381 |
|  | 5 |  |  | 254 |
|  | 15 |  |  | 268 |
|  | 16 |  |  | 247 |
| 16 | 4 |  |  | 147 |
|  | 5 |  |  | 351 |
|  | 15 |  |  | 257 |
|  | 16 |  |  | 361 |
| H | 4 |  |  | 189 |
|  | 5 |  |  | 258 |
|  | 15 |  |  | 159 |
|  | 16 |  |  | 357 |

$R_1$*: Number of carbon atoms in $R_1$
$R_2$**: Number of carbon atoms in $R_2$
E***: Cell voltage

TABLE 4

| $R_1$* or H | $R_2$** | n | m | E*** |
|---|---|---|---|---|
| 4 | 4 | 1 | 1 | 358 |
|  | 5 |  |  | 145 |
|  | 15 |  |  | 352 |
|  | 16 |  |  | 234 |
| 5 | 4 |  |  | 481 |
|  | 5 |  |  | 751 |
|  | 15 |  |  | 756 |
|  | 16 |  |  | 458 |
| 15 | 4 |  |  | 551 |
|  | 5 |  |  | 735 |
|  | 15 |  |  | 728 |
|  | 16 |  |  | 458 |

TABLE 4-continued

| R₁* or H | R₂** | n | m | E*** |
|---|---|---|---|---|
| 16 | 4 | | | 368 |
| | 5 | | | 325 |
| | 15 | | | 451 |
| | 16 | | | 321 |
| H | 4 | | | 325 |
| | 5 | | | 745 |
| | 15 | | | 776 |
| | 16 | | | 451 |
| 4 | 4 | 2 | 1 | 325 |
| | 5 | | | 410 |
| | 15 | | | 352 |
| | 16 | | | 251 |
| 5 | 4 | | | 254 |
| | 5 | | | 768 |
| | 15 | | | 751 |
| | 16 | | | 451 |
| 15 | 4 | | | 440 |
| | 5 | | | 754 |
| | 15 | | | 752 |
| | 16 | | | 251 |
| 16 | 4 | | | 352 |
| | 5 | | | 245 |
| | 15 | | | 256 |
| | 16 | | | 100 |
| H | 4 | | | 152 |
| | 5 | | | 754 |
| | 15 | | | 745 |
| | 16 | | | 362 |

R₁*: Number of carbon atoms in R₁
R₂**: Number of carbon atoms in R₂
E***: Cell voltage

TABLE 5

| R₁* or H | R₂** | n | m | E*** |
|---|---|---|---|---|
| 4 | 4 | 3 | 1 | 321 |
| | 5 | | | 321 |
| | 15 | | | 351 |
| | 16 | | | 365 |
| 5 | 4 | | | 352 |
| | 5 | | | 775 |
| | 15 | | | 742 |
| | 16 | | | 254 |
| 15 | 4 | | | 365 |
| | 5 | | | 726 |
| | 15 | | | 746 |
| | 16 | | | 325 |
| 16 | 4 | | | 214 |
| | 5 | | | 256 |
| | 15 | | | 352 |
| | 16 | | | 254 |
| H | 4 | | | 265 |
| | 5 | | | 749 |
| | 15 | | | 784 |
| | 16 | | | 231 |
| 4 | 4 | 4 | 1 | 362 |
| | 5 | | | 254 |
| | 15 | | | 214 |
| | 16 | | | 251 |
| 5 | 4 | | | 254 |
| | 5 | | | 724 |
| | 15 | | | 754 |
| | 16 | | | 254 |
| 15 | 4 | | | 256 |
| | 5 | | | 785 |
| | 15 | | | 745 |
| | 16 | | | 235 |
| 16 | 4 | | | 214 |
| | 5 | | | 236 |
| | 15 | | | 254 |
| | 16 | | | 365 |
| H | 4 | | | 254 |
| | 5 | | | 766 |
| | 15 | | | 754 |
| | 16 | | | 251 |

R₁*: Number of carbon atoms in R₁
R₂**: Number of carbon atoms in R₂
E***: Cell voltage

TABLE 6

| R₁* or H | R₂** | n | m | E*** |
|---|---|---|---|---|
| 4 | 4 | 5 | 1 | 321 |
| | 5 | | | 325 |
| | 15 | | | 321 |
| | 16 | | | 251 |
| 5 | 4 | | | 324 |
| | 5 | | | 225 |
| | 15 | | | 321 |
| | 16 | | | 352 |
| 15 | 4 | | | 324 |
| | 5 | | | 325 |
| | 15 | | | 321 |
| | 16 | | | 352 |
| 16 | 4 | | | 325 |
| | 5 | | | 412 |
| | 15 | | | 215 |
| | 16 | | | 251 |
| H | 4 | | | 325 |
| | 5 | | | 214 |
| | 15 | | | 251 |
| | 16 | | | 325 |
| 4 | 4 | 1 | 2 | 326 |
| | 5 | | | 325 |
| | 15 | | | 321 |
| | 16 | | | 352 |
| 5 | 4 | | | 324 |
| | 5 | | | 756 |
| | 15 | | | 784 |
| | 16 | | | 125 |
| 15 | 4 | | | 235 |
| | 5 | | | 746 |
| | 15 | | | 754 |
| | 16 | | | 325 |
| 16 | 4 | | | 265 |
| | 5 | | | 341 |
| | 15 | | | 254 |
| | 16 | | | 321 |
| H | 4 | | | 210 |
| | 5 | | | 765 |
| | 15 | | | 785 |
| | 16 | | | 365 |

R₁*: Number of carbon atoms in R₁
R₂**: Number of carbon atoms in R₂
E***: Cell voltage

TABLE 7

| R₁* or H | R₂** | n | m | E*** |
|---|---|---|---|---|
| 4 | 4 | 2 | 2 | 100 |
| | 5 | | | 254 |
| | 15 | | | 241 |
| | 16 | | | 256 |
| 5 | 4 | | | 254 |
| | 5 | | | 745 |
| | 15 | | | 724 |
| | 16 | | | 321 |
| 15 | 4 | | | 325 |
| | 5 | | | 745 |
| | 15 | | | 746 |
| | 16 | | | 256 |
| 16 | 4 | | | 452 |
| | 5 | | | 235 |

TABLE 7-continued

| R₁* or H | R₂** | n | m | E*** |
|---|---|---|---|---|
|   | 15 |   |   | 256 |
|   | 16 |   |   | 120 |
| H | 4 |   |   | 251 |
|   | 5 |   |   | 774 |
|   | 15 |   |   | 754 |
|   | 16 |   |   | 231 |
| 4 | 4 | 3 | 2 | 362 |
|   | 5 |   |   | 325 |
|   | 15 |   |   | 214 |
|   | 16 |   |   | 265 |
| 5 | 4 |   |   | 251 |
|   | 5 |   |   | 745 |
|   | 15 |   |   | 756 |
|   | 16 |   |   | 254 |
| 15 | 4 |   |   | 236 |
|   | 5 |   |   | 785 |
|   | 15 |   |   | 745 |
|   | 16 |   |   | 213 |
| 16 | 4 |   |   | 265 |
|   | 5 |   |   | 250 |
|   | 15 |   |   | 23 |
|   | 16 |   |   | 251 |
| H | 4 |   |   | 25 |
|   | 5 |   |   | 784 |
|   | 15 |   |   | 722 |
|   | 16 |   |   | 123 |

R₁*: Number of carbon atoms in $R_1$
R₂**: Number of carbon atoms in $R_2$
E***: Cell voltage

TABLE 8

| R₁* or H | R₂** | n | m | E*** |
|---|---|---|---|---|
| 4 | 4 | 4 | 2 | 235 |
|   | 5 |   |   | 124 |
|   | 15 |   |   | 23 |
|   | 16 |   |   | 251 |
| 5 | 4 |   |   | 235 |
|   | 5 |   |   | 114 |
|   | 15 |   |   | 123 |
|   | 16 |   |   | 156 |
| 15 | 4 |   |   | 231 |
|   | 5 |   |   | 251 |
|   | 15 |   |   | 325 |
|   | 16 |   |   | 214 |
| 16 | 4 |   |   | 214 |
|   | 5 |   |   | 25 |
|   | 15 |   |   | 321 |
|   | 16 |   |   | 20 |
| H | 4 |   |   | 325 |
|   | 5 |   |   | 36 |
|   | 15 |   |   | 251 |
|   | 16 |   |   | 20 |
| 4 | 4 | 1 | 3 | 251 |
|   | 5 |   |   | 254 |
|   | 15 |   |   | 23 |
|   | 16 |   |   | 214 |
| 5 | 4 |   |   | 251 |
|   | 5 |   |   | 754 |
|   | 15 |   |   | 745 |
|   | 16 |   |   | 251 |
| 15 | 4 |   |   | 236 |
|   | 5 |   |   | 774 |
|   | 15 |   |   | 745 |
|   | 16 |   |   | 231 |
| 16 | 4 |   |   | 10 |
|   | 5 |   |   | 25 |
|   | 15 |   |   | 325 |
|   | 16 |   |   | 241 |

TABLE 8-continued

| R₁* or H | R₂** | n | m | E*** |
|---|---|---|---|---|
| H | 4 |   |   | 365 |
|   | 5 |   |   | 745 |
|   | 15 |   |   | 785 |
|   | 16 |   |   | 245 |

R₁*: Number of carbon atoms in $R_1$
R₂**: Number of carbon atoms in $R_2$
E***: Cell voltage

TABLE 9

| R₁* or H | R₂** | n | m | E*** |
|---|---|---|---|---|
| 4 | 4 | 2 | 3 | 365 |
|   | 5 |   |   | 251 |
|   | 15 |   |   | 458 |
|   | 16 |   |   | 25 |
| 5 | 4 |   |   | 241 |
|   | 5 |   |   | 745 |
|   | 15 |   |   | 786 |
|   | 16 |   |   | 252 |
| 15 | 4 |   |   | 457 |
|   | 5 |   |   | 784 |
|   | 15 |   |   | 733 |
|   | 16 |   |   | 251 |
| 16 | 4 |   |   | 325 |
|   | 5 |   |   | 254 |
|   | 15 |   |   | 12 |
|   | 16 |   |   | 25 |
| H | 4 |   |   | 265 |
|   | 5 |   |   | 788 |
|   | 15 |   |   | 754 |
|   | 16 |   |   | 521 |
| 4 | 4 | 3 | 3 | 251 |
|   | 5 |   |   | 25 |
|   | 15 |   |   | 145 |
|   | 16 |   |   | 21 |
| 5 | 4 |   |   | 35 |
|   | 5 |   |   | 265 |
|   | 15 |   |   | 25 |
|   | 16 |   |   | 214 |
| 15 | 4 |   |   | 2 |
|   | 5 |   |   | 254 |
|   | 15 |   |   | 325 |
|   | 16 |   |   | 25 |
| 16 | 4 |   |   | 25 |
|   | 5 |   |   | 11 |
|   | 15 |   |   | 25 |
|   | 16 |   |   | 2 |
| H | 4 |   |   | 244 |
|   | 5 |   |   | 214 |
|   | 15 |   |   | 2 |
|   | 16 |   |   | 35 |

R₁*: Number of carbon atoms in $R_1$
R₂**: Number of carbon atoms in $R_2$
E***: Cell voltage

TABLE 10

| R₁* or H | R₂** | n | m | E*** |
|---|---|---|---|---|
| 4 | 4 | 1 | 4 | 2 |
|   | 5 |   |   | 25 |
|   | 15 |   |   | 56 |
|   | 16 |   |   | 23 |
| 5 | 4 |   |   | 25 |
|   | 5 |   |   | 745 |
|   | 15 |   |   | 748 |
|   | 16 |   |   | 65 |
| 15 | 4 |   |   | 244 |
|   | 5 |   |   | 754 |
|   | 15 |   |   | 712 |
|   | 16 |   |   | 251 |

TABLE 10-continued

| R₁* or H | R₂** | n | m | E*** |
|---|---|---|---|---|
| 16 | 4 | | | 212 |
| | 5 | | | 25 |
| | 15 | | | 15 |
| | 16 | | | 356 |
| H | 4 | | | 32 |
| | 5 | | | 754 |
| | 15 | | | 774 |
| | 16 | | | 25 |
| 4 | 4 | 2 | 4 | 32 |
| | 5 | | | 542 |
| | 15 | | | 25 |
| | 16 | | | 21 |
| 5 | 4 | | | 35 |
| | 5 | | | 325 |
| | 15 | | | 21 |
| | 16 | | | 25 |
| 15 | 4 | | | 2 |
| | 5 | | | 26 |
| | 15 | | | 2 |
| | 16 | | | 251 |
| 16 | 4 | | | 25 |
| | 5 | | | 251 |
| | 15 | | | 11 |
| | 16 | | | 235 |
| H | 4 | | | 21 |
| | 5 | | | 114 |
| | 15 | | | 253 |
| | 16 | | | 21 |

$R_1^*$: Number of carbon atoms in $R_1$
$R_2^{**}$: Number of carbon atoms in $R_2$
$E^{***}$: Cell voltage

TABLE 11

| R₁* or H | R₂** | n | m | E*** |
|---|---|---|---|---|
| 4 | 4 | 0 | 1 | 412 |
| | 5 | | | 410 |
| | 15 | | | 120 |
| | 16 | | | 254 |
| 5 | 4 | | | 257 |
| | 5 | | | 751 |
| | 15 | | | 762 |
| | 16 | | | 421 |
| 15 | 4 | | | 451 |
| | 5 | | | 774 |
| | 15 | | | 775 |
| | 16 | | | 215 |
| 16 | 4 | | | 451 |
| | 5 | | | 251 |
| | 15 | | | 254 |
| | 16 | | | 62 |
| H | 4 | | | 110 |
| | 5 | | | 774 |
| | 15 | | | 784 |
| | 16 | | | 362 |
| 4 | 4 | 0 | 2 | 25 |
| | 5 | | | 254 |
| | 15 | | | 213 |
| | 16 | | | 25 |
| 5 | 4 | | | 544 |
| | 5 | | | 751 |
| | 15 | | | 757 |
| | 16 | | | 451 |
| 15 | 4 | | | 415 |
| | 5 | | | 778 |
| | 15 | | | 754 |
| | 16 | | | 75 |
| 16 | 4 | | | 362 |
| | 5 | | | 25 |
| | 15 | | | 14 |
| | 16 | | | 158 |
| H | 4 | | | 455 |
| | 5 | | | 774 |

TABLE 11-continued

| R₁* or H | R₂** | n | m | E*** |
|---|---|---|---|---|
| | 15 | | | 795 |
| | 16 | | | 333 |

$R_1^*$: Number of carbon atoms in $R_1$
$R_2^{**}$: Number of carbon atoms in $R_2$
$E^{***}$: Cell voltage

TABLE 12

| R₁* or H | R₂** | n | m | E*** |
|---|---|---|---|---|
| 4 | 4 | 0 | 3 | 325 |
| | 5 | | | 315 |
| | 15 | | | 152 |
| | 16 | | | 14 |
| 5 | 4 | | | 455 |
| | 5 | | | 778 |
| | 15 | | | 754 |
| | 16 | | | 320 |
| 15 | 4 | | | 215 |
| | 5 | | | 777 |
| | 15 | | | 769 |
| | 16 | | | 451 |
| 16 | 4 | | | 325 |
| | 5 | | | 322 |
| | 15 | | | 41 |
| | 16 | | | 45 |
| H | 4 | | | 455 |
| | 5 | | | 755 |
| | 15 | | | 751 |
| | 16 | | | 444 |
| 4 | 4 | 0 | 4 | 451 |
| | 5 | | | 251 |
| | 15 | | | 25 |
| | 16 | | | 45 |
| 5 | 4 | | | 255 |
| | 5 | | | 774 |
| | 15 | | | 771 |
| | 16 | | | 485 |
| 15 | 4 | | | 444 |
| | 5 | | | 754 |
| | 15 | | | 758 |
| | 16 | | | 458 |
| 16 | 4 | | | 362 |
| | 5 | | | 451 |
| | 15 | | | 211 |
| | 16 | | | 251 |
| H | 4 | | | 154 |
| | 5 | | | 712 |
| | 15 | | | 722 |
| | 16 | | | 296 |

$R_1^*$: Number of carbon atoms in $R_1$
$R_2^{**}$: Number of carbon atoms in $R_2$
$E^{***}$: Cell voltage

TABLE 13

| R₁* or H | R₂** | n | m | E*** |
|---|---|---|---|---|
| 4 | 4 | 0 | 5 | 25 |
| | 5 | | | 21 |
| | 15 | | | 214 |
| | 16 | | | 21 |
| 5 | 4 | | | 215 |
| | 5 | | | 744 |
| | 15 | | | 754 |
| | 16 | | | 321 |
| 15 | 4 | | | 25 |
| | 5 | | | 711 |
| | 15 | | | 721 |
| | 16 | | | 482 |
| 16 | 4 | | | 330 |
| | 5 | | | 401 |

TABLE 13-continued

| $R_1$* or H | $R_2$** | n | m | E*** |
|---|---|---|---|---|
|  | 15 |  |  | 479 |
|  | 16 |  |  | 25 |
| H | 4 |  |  | 170 |
|  | 5 |  |  | 755 |
|  | 15 |  |  | 741 |
|  | 16 |  |  | 25 |
| 4 | 4 | 1 | 5 | 236 |
|  | 5 |  |  | 251 |
|  | 15 |  |  | 41 |
|  | 16 |  |  | 251 |
| 5 | 4 |  |  | 325 |
|  | 5 |  |  | 25 |
|  | 15 |  |  | 215 |
|  | 16 |  |  | 21 |
| 15 | 4 |  |  | 255 |
|  | 5 |  |  | 211 |
|  | 15 |  |  | 23 |
|  | 16 |  |  | 255 |
| 16 | 4 |  |  | 214 |
|  | 5 |  |  | 233 |
|  | 15 |  |  | 25 |
|  | 16 |  |  | 21 |
| H | 4 |  |  | 25 |
|  | 5 |  |  | 362 |
|  | 15 |  |  | 25 |
|  | 16 |  |  | 211 |

$R_1$*: Number of carbon atoms in $R_1$
$R_2$**: Number of carbon atoms in $R_2$
E***: Cell voltage The above results show that, when $R^1$ and $R^2$ are independently hydrogen or an alkyl group having not less than 5 and not more than 15 carbon atoms, and n and m satisfied $0 \leq n \leq 5$, $0 \leq m \leq 5$ and $1 \leq n+m \leq 5$, the discharge performance was high and a cell voltage of not less than 700 mV was obtained. When each parameter was out of the above range, on the other hand, the cell voltage was not more than 500 mV.

COMPARATIVE EXAMPLE 1

An MEA was produced in the same manner as in Example 1, except that, in the production process of the gas diffusion layer, a surfactant of octyl phenol ethoxylate (Triton X-100, produced by NAGASE & CO., LTD.) was used in place of the alkylene oxide type surfactant and D-1 produced by DAIKIN INDUSTRIES, LTD. was used as a dispersion of PTFE in place of D-1 E produced by DAIKIN INDUSTRIES, LTD. This MEA is referred to as MEA-2. Further, Cell 2 comprising a cell stack of 100 cells was produced in the same manner as in Example 1, except that MEA-2 was used in place of MEA-1.

The same discharge test as in Example 1 was conducted on Cell 2 and a cell voltage of 735 mV was obtained.

EXAMPLE 2

By carrying out the same operation as in Example 1 except that 2 mol/l of a methanol aqueous solution at a temperature of 60° C. was supplied to the anode of Cell 1, a discharge test was conducted on the cell as a direct type methanol fuel cell. Also here, humidification was conducted by passage of the air through a bubbler at 45° C. to 70° C., and the cell temperature was set at 75° C. and the air utilization rate (Uo) was set at 40%.

The relationship between the parameters $R^1$, $R^2$, m and n in the formula of the surfactant used for Cell 1 and the cell voltages of Cell 1 at a current density of 0.05 mA/cm² are shown in the following Tables 14 to 26:

TABLE 14

| $R_1$* or H | $R_2$** | n | m | E*** |
|---|---|---|---|---|
| 4 | 4 | 1 | 0 | 12 |
|  | 5 |  |  | 123 |
|  | 15 |  |  | 12 |
|  | 16 |  |  | 15 |
| 5 | 4 |  |  | 1 |
|  | 5 |  |  | 445 |
|  | 15 |  |  | 415 |
|  | 16 |  |  | 45 |
| 15 | 4 |  |  | 25 |
|  | 5 |  |  | 475 |
|  | 15 |  |  | 412 |
|  | 16 |  |  | 20 |
| 16 | 4 |  |  | 14 |
|  | 5 |  |  | 25 |
|  | 15 |  |  | 0 |
|  | 16 |  |  | 21 |
| H | 4 |  |  | 25 |
|  | 5 |  |  | 457 |
|  | 15 |  |  | 458 |
|  | 16 |  |  | 21 |
| 4 | 4 | 2 | 0 | 25 |
|  | 5 |  |  | 12 |
|  | 15 |  |  | 47 |
|  | 16 |  |  | 5 |
| 5 | 4 |  |  | 256 |
|  | 5 |  |  | 485 |
|  | 15 |  |  | 510 |
|  | 16 |  |  | 25 |
| 15 | 4 |  |  | 21 |
|  | 5 |  |  | 447 |
|  | 15 |  |  | 458 |
|  | 16 |  |  | 25 |
| 16 | 4 |  |  | 2 |
|  | 5 |  |  | 36 |
|  | 15 |  |  | 2 |
|  | 16 |  |  | 4 |
| H | 4 |  |  | 25 |
|  | 5 |  |  | 456 |
|  | 15 |  |  | 541 |
|  | 16 |  |  | 21 |

$R_1$*: Number of carbon atoms in $R_1$
$R_2$**: Number of carbon atoms in $R_2$
E***: Cell voltage

TABLE 15

| $R_1$* or H | $R_2$** | n | m | E*** |
|---|---|---|---|---|
| 4 | 4 | 3 | 0 | 25 |
|  | 5 |  |  | 1 |
|  | 15 |  |  | 2 |
|  | 16 |  |  | 14 |
| 5 | 4 |  |  | 25 |
|  | 5 |  |  | 485 |
|  | 15 |  |  | 445 |
|  | 16 |  |  | 52 |
| 15 | 4 |  |  | 25 |
|  | 5 |  |  | 455 |
|  | 15 |  |  | 521 |
|  | 16 |  |  | 52 |
| 16 | 4 |  |  | 54 |
|  | 5 |  |  | 52 |
|  | 15 |  |  | 3 |
|  | 16 |  |  | 54 |
| H | 4 |  |  | 25 |
|  | 5 |  |  | 458 |
|  | 15 |  |  | 574 |
|  | 16 |  |  | 25 |
| 4 | 4 | 4 | 0 | 21 |
|  | 5 |  |  | 52 |
|  | 15 |  |  | 32 |
|  | 16 |  |  | 4 |

TABLE 15-continued

| $R_1$* or H | $R_2$** | n | m | E*** |
|---|---|---|---|---|
| 5 | 4 | | | 25 |
| | 5 | | | 456 |
| | 15 | | | 512 |
| | 16 | | | 47 |
| 15 | 4 | | | 251 |
| | 5 | | | 458 |
| | 15 | | | 455 |
| | 16 | | | 25 |
| 16 | 4 | | | 52 |
| | 5 | | | 14 |
| | 15 | | | 3 |
| | 16 | | | 25 |
| H | 4 | | | 25 |
| | 5 | | | 455 |
| | 15 | | | 566 |
| | 16 | | | 25 |

$R_1$*: Number of carbon atoms in $R_1$
$R_2$**: Number of carbon atoms in $R_2$
E***: Cell voltage

TABLE 16

| $R_1$* or H | $R_2$** | n | m | E*** |
|---|---|---|---|---|
| 4 | 4 | 5 | 0 | 25 |
| | 5 | | | 21 |
| | 15 | | | 23 |
| | 16 | | | 6 |
| 5 | 4 | | | 25 |
| | 5 | | | 455 |
| | 15 | | | 424 |
| | 16 | | | 52 |
| 15 | 4 | | | 14 |
| | 5 | | | 510 |
| | 15 | | | 512 |
| | 16 | | | 25 |
| 16 | 4 | | | 47 |
| | 5 | | | 32 |
| | 15 | | | 0 |
| | 16 | | | 2 |
| H | 4 | | | 53 |
| | 5 | | | 451 |
| | 15 | | | 412 |
| | 16 | | | 25 |
| 4 | 4 | 6 | 0 | 21 |
| | 5 | | | 25 |
| | 15 | | | 3 |
| | 16 | | | 52 |
| 5 | 4 | | | 256 |
| | 5 | | | 458 |
| | 15 | | | 500 |
| | 16 | | | 321 |
| 15 | 4 | | | 52 |
| | 5 | | | 21 |
| | 15 | | | 52 |
| | 16 | | | 3 |
| 16 | 4 | | | 25 |
| | 5 | | | 12 |
| | 15 | | | 25 |
| | 16 | | | 1 |
| H | 4 | | | 25 |
| | 5 | | | 25 |
| | 15 | | | 2 |
| | 16 | | | 0 |

$R_1$*: Number of carbon atoms in $R_1$
$R_2$**: Number of carbon atoms in $R_2$
E***: Cell voltage

TABLE 17

| $R_1$* or H | $R_2$** | n | m | E*** |
|---|---|---|---|---|
| 4 | 4 | 1 | 1 | 25 |
| | 5 | | | 12 |
| | 15 | | | 25 |
| | 16 | | | 2 |
| 5 | 4 | | | 152 |
| | 5 | | | 451 |
| | 15 | | | 410 |
| | 16 | | | 25 |
| 15 | 4 | | | 14 |
| | 5 | | | 421 |
| | 15 | | | 411 |
| | 16 | | | 25 |
| 16 | 4 | | | 321 |
| | 5 | | | 25 |
| | 15 | | | 21 |
| | 16 | | | 25 |
| H | 4 | | | 24 |
| | 5 | | | 451 |
| | 15 | | | 410 |
| | 16 | | | 25 |
| 4 | 4 | 2 | 1 | 25 |
| | 5 | | | 32 |
| | 15 | | | 25 |
| | 16 | | | 25 |
| 5 | 4 | | | 1 |
| | 5 | | | 455 |
| | 15 | | | 410 |
| | 16 | | | 25 |
| 15 | 4 | | | 325 |
| | 5 | | | 451 |
| | 15 | | | 456 |
| | 16 | | | 25 |
| 16 | 4 | | | 214 |
| | 5 | | | 2 |
| | 15 | | | 1 |
| | 16 | | | 0 |
| H | 4 | | | 255 |
| | 5 | | | 458 |
| | 15 | | | 475 |
| | 16 | | | 254 |

$R_1$*: Number of carbon atoms in $R_1$
$R_2$**: Number of carbon atoms in $R_2$
E***: Cell voltage

TABLE 18

| $R_1$* or H | $R_2$** | n | m | E*** |
|---|---|---|---|---|
| 4 | 4 | 3 | 1 | 25 |
| | 5 | | | 3 |
| | 15 | | | 25 |
| | 16 | | | 2 |
| 5 | 4 | | | 1 |
| | 5 | | | 455 |
| | 15 | | | 475 |
| | 16 | | | 25 |
| 15 | 4 | | | 24 |
| | 5 | | | 455 |
| | 15 | | | 465 |
| | 16 | | | 252 |
| 16 | 4 | | | 252 |
| | 5 | | | 5 |
| | 15 | | | 23 |
| | 16 | | | 25 |
| H | 4 | | | 25 |
| | 5 | | | 458 |
| | 15 | | | 471 |
| | 16 | | | 5 |
| 4 | 4 | 4 | 1 | 62 |
| | 5 | | | 58 |
| | 15 | | | 2 |
| | 16 | | | 1 |
| 5 | 4 | | | 456 |
| | 5 | | | 512 |

TABLE 18-continued

| $R_1$* or H | $R_2$** | n | m | E*** |
|---|---|---|---|---|
|  | 15 |  |  | 2 |
|  | 16 |  |  | 58 |
| 15 | 4 |  |  | 2 |
|  | 5 |  |  | 412 |
|  | 15 |  |  | 441 |
|  | 16 |  |  | 25 |
| 16 | 4 |  |  | 321 |
|  | 5 |  |  | 25 |
|  | 15 |  |  | 32 |
|  | 16 |  |  | 0 |
| H | 4 |  |  | 41 |
|  | 5 |  |  | 412 |
|  | 15 |  |  | 452 |
|  | 16 |  |  | 2 |

$R_1$*: Number of carbon atoms in $R_1$
$R_2$**: Number of carbon atoms in $R_2$
E***: Cell voltage

TABLE 19

| $R_1$* or H | $R_2$** | n | m | E*** |
|---|---|---|---|---|
| 4 | 4 | 5 | 1 | 6 |
|  | 5 |  |  | 2 |
|  | 15 |  |  | 0 |
|  | 16 |  |  | 0 |
| 5 | 4 |  |  | 0 |
|  | 5 |  |  | 25 |
|  | 15 |  |  | 2 |
|  | 16 |  |  | 3 |
| 15 | 4 |  |  | 0 |
|  | 5 |  |  | 0 |
|  | 15 |  |  | 0 |
|  | 16 |  |  | 25 |
| 16 | 4 |  |  | 0 |
|  | 5 |  |  | 0 |
|  | 15 |  |  | 35 |
|  | 16 |  |  | 0 |
| H | 4 |  |  | 0 |
|  | 5 |  |  | 47 |
|  | 15 |  |  | 2 |
|  | 16 |  |  | 5 |
| 4 | 4 | 1 | 2 | 25 |
|  | 5 |  |  | 21 |
|  | 15 |  |  | 2 |
|  | 16 |  |  | 47 |
| 5 | 4 |  |  | 261 |
|  | 5 |  |  | 455 |
|  | 15 |  |  | 421 |
|  | 16 |  |  | 41 |
| 15 | 4 |  |  | 25 |
|  | 5 |  |  | 412 |
|  | 15 |  |  | 432 |
|  | 16 |  |  | 25 |
| 16 | 4 |  |  | 0 |
|  | 5 |  |  | 2 |
|  | 15 |  |  | 1 |
|  | 16 |  |  | 0 |
| H | 4 |  |  | 0 |
|  | 5 |  |  | 485 |
|  | 15 |  |  | 547 |
|  | 16 |  |  | 20 |

$R_1$*: Number of carbon atoms in $R_1$
$R_2$**: Number of carbon atoms in $R_2$
E***: Cell voltage

TABLE 20

| $R_1$* or H | $R_2$** | n | m | E*** |
|---|---|---|---|---|
| 4 | 4 | 2 | 2 | 25 |
|  | 5 |  |  | 2 |
|  | 15 |  |  | 0 |
|  | 16 |  |  | 0 |
| 5 | 4 |  |  | 23 |
|  | 5 |  |  | 410 |
|  | 15 |  |  | 410 |
|  | 16 |  |  | 2 |
| 15 | 4 |  |  | 56 |
|  | 5 |  |  | 475 |
|  | 15 |  |  | 466 |
|  | 16 |  |  | 5 |
| 16 | 4 |  |  | 2 |
|  | 5 |  |  | 0 |
|  | 15 |  |  | 0 |
|  | 16 |  |  | 0 |
| H | 4 |  |  | 236 |
|  | 5 |  |  | 452 |
|  | 15 |  |  | 496 |
|  | 16 |  |  | 23 |
| 4 | 4 | 3 | 2 | 0 |
|  | 5 |  |  | 0 |
|  | 15 |  |  | 3 |
|  | 16 |  |  | 2 |
| 5 | 4 |  |  | 251 |
|  | 5 |  |  | 462 |
|  | 15 |  |  | 561 |
|  | 16 |  |  | 23 |
| 15 | 4 |  |  | 2 |
|  | 5 |  |  | 455 |
|  | 15 |  |  | 412 |
|  | 16 |  |  | 362 |
| 16 | 4 |  |  | 23 |
|  | 5 |  |  | 0 |
|  | 15 |  |  | 0 |
|  | 16 |  |  | 0 |
| H | 4 |  |  | 25 |
|  | 5 |  |  | 452 |
|  | 15 |  |  | 468 |
|  | 16 |  |  | 49 |

$R_1$*: Number of carbon atoms in $R_1$
$R_2$**: Number of carbon atoms in $R_2$
E***: Cell voltage

TABLE 21

| $R_1$* or H | $R_2$** | n | m | E*** |
|---|---|---|---|---|
| 4 | 4 | 4 | 2 | 23 |
|  | 5 |  |  | 0 |
|  | 15 |  |  | 0 |
|  | 16 |  |  | 0 |
| 5 | 4 |  |  | 15 |
|  | 5 |  |  | 0 |
|  | 15 |  |  | 0 |
|  | 16 |  |  | 0 |
| 15 | 4 |  |  | 25 |
|  | 5 |  |  | 0 |
|  | 15 |  |  | 0 |
|  | 16 |  |  | 25 |
| 16 | 4 |  |  | 0 |
|  | 5 |  |  | 0 |
|  | 15 |  |  | 0 |
|  | 16 |  |  | 25 |
| H | 4 |  |  | 0 |
|  | 5 |  |  | 0 |
|  | 15 |  |  | 0 |
|  | 16 |  |  | 0 |
| 4 | 4 | 1 | 3 | 235 |
|  | 5 |  |  | 2 |
|  | 15 |  |  | 52 |
|  | 16 |  |  | 2 |
| 5 | 4 |  |  | 254 |
|  | 5 |  |  | 456 |
|  | 15 |  |  | 510 |
|  | 16 |  |  | 25 |

TABLE 21-continued

| R₁* or H | R₂** | n | m | E*** |
|---|---|---|---|---|
| 15 | 4 | | | 251 |
|  | 5 | | | 561 |
|  | 15 | | | 521 |
|  | 16 | | | 25 |
| 16 | 4 | | | 25 |
|  | 5 | | | 1 |
|  | 15 | | | 0 |
|  | 16 | | | 0 |
| H | 4 | | | 362 |
|  | 5 | | | 458 |
|  | 15 | | | 517 |
|  | 16 | | | 331 |

$R_1^*$: Number of carbon atoms in $R_1$
$R_2^{**}$: Number of carbon atoms in $R_2$
$E^{***}$: Cell voltage

TABLE 22

| R₁* or H | R₂** | n | m | E*** |
|---|---|---|---|---|
| 4 | 4 | 2 | 3 | 21 |
|  | 5 | | | 0 |
|  | 15 | | | 0 |
|  | 16 | | | 25 |
| 5 | 4 | | | 2 |
|  | 5 | | | 451 |
|  | 15 | | | 482 |
|  | 16 | | | 213 |
| 15 | 4 | | | 25 |
|  | 5 | | | 469 |
|  | 15 | | | 458 |
|  | 16 | | | 214 |
| 16 | 4 | | | 23 |
|  | 5 | | | 25 |
|  | 15 | | | 0 |
|  | 16 | | | 0 |
| H | 4 | | | 256 |
|  | 5 | | | 475 |
|  | 15 | | | 496 |
|  | 16 | | | 51 |
| 4 | 4 | 3 | 3 | 23 |
|  | 5 | | | 0 |
|  | 15 | | | 0 |
|  | 16 | | | 0 |
| 5 | 4 | | | 41 |
|  | 5 | | | 0 |
|  | 15 | | | 0 |
|  | 16 | | | 25 |
| 15 | 4 | | | 0 |
|  | 5 | | | 0 |
|  | 15 | | | 251 |
|  | 16 | | | 0 |
| 16 | 4 | | | 0 |
|  | 5 | | | 25 |
|  | 15 | | | 0 |
|  | 16 | | | 0 |
| H | 4 | | | 0 |
|  | 5 | | | 32 |
|  | 15 | | | 0 |
|  | 16 | | | 0 |

$R_1^*$: Number of carbon atoms in $R_1$
$R_2^{**}$: Number of carbon atoms in $R_2$
$E^{***}$: Cell voltage

TABLE 23

| R₁* or H | R₂** | n | m | E*** |
|---|---|---|---|---|
| 4 | 4 | 1 | 4 | 0 |
|  | 5 | | | 25 |
|  | 15 | | | 123 |
|  | 16 | | | 251 |
| 5 | 4 | | | 25 |
|  | 5 | | | 451 |
|  | 15 | | | 412 |
|  | 16 | | | 25 |
| 15 | 4 | | | 125 |
|  | 5 | | | 451 |
|  | 15 | | | 462 |
|  | 16 | | | 25 |
| 16 | 4 | | | 251 |
|  | 5 | | | 2 |
|  | 15 | | | 0 |
|  | 16 | | | 0 |
| H | 4 | | | 25 |
|  | 5 | | | 451 |
|  | 15 | | | 423 |
|  | 16 | | | 25 |
| 4 | 4 | 2 | 4 | 32 |
|  | 5 | | | 0 |
|  | 15 | | | 1 |
|  | 16 | | | 2 |
| 5 | 4 | | | 0 |
|  | 5 | | | 0 |
|  | 15 | | | 0 |
|  | 16 | | | 0 |
| 15 | 4 | | | 0 |
|  | 5 | | | 25 |
|  | 15 | | | 0 |
|  | 16 | | | 0 |
| 16 | 4 | | | 0 |
|  | 5 | | | 2 |
|  | 15 | | | 0 |
|  | 16 | | | 0 |
| H | 4 | | | 0 |
|  | 5 | | | 52 |
|  | 15 | | | 0 |
|  | 16 | | | 0 |

$R_1^*$: Number of carbon atoms in $R_1$
$R_2^{**}$: Number of carbon atoms in $R_2$
$E^{***}$: Cell voltage

TABLE 24

| R₁* or H | R₂** | n | m | E*** |
|---|---|---|---|---|
| 4 | 4 | 0 | 1 | 11 |
|  | 5 | | | 13 |
|  | 15 | | | 20 |
|  | 16 | | | 0 |
| 5 | 4 | | | 48 |
|  | 5 | | | 441 |
|  | 15 | | | 410 |
|  | 16 | | | 25 |
| 15 | 4 | | | 23 |
|  | 5 | | | 410 |
|  | 15 | | | 421 |
|  | 16 | | | 36 |
| 16 | 4 | | | 32 |
|  | 5 | | | 25 |
|  | 15 | | | 15 |
|  | 16 | | | 32 |
| H | 4 | | | 25 |
|  | 5 | | | 455 |
|  | 15 | | | 412 |
|  | 16 | | | 36 |
| 4 | 4 | 0 | 2 | 36 |
|  | 5 | | | 56 |
|  | 15 | | | 121 |
|  | 16 | | | 56 |
| 5 | 4 | | | 254 |
|  | 5 | | | 455 |
|  | 15 | | | 500 |
|  | 16 | | | 25 |
| 15 | 4 | | | 62 |
|  | 5 | | | 410 |

TABLE 24-continued

| R₁*or H | R₂** | n | m | E*** |
|---|---|---|---|---|
|  | 15 |  |  | 485 |
|  | 16 |  |  | 26 |
| 16 | 4 |  |  | 69 |
|  | 5 |  |  | 3 |
|  | 15 |  |  | 0 |
|  | 16 |  |  | 0 |
| H | 4 |  |  | 25 |
|  | 5 |  |  | 440 |
|  | 15 |  |  | 444 |
|  | 16 |  |  | 21 |

R₁*: Number of carbon atoms in R₁
R₂**: Number of carbon atoms in R₂
E***: Cell voltage

TABLE 25

| R₁* or H | R₂** | n | m | E*** |
|---|---|---|---|---|
| 4 | 4 | 0 | 3 | 25 |
|  | 5 |  |  | 21 |
|  | 15 |  |  | 2 |
|  | 16 |  |  | 0 |
| 5 | 4 |  |  | 36 |
|  | 5 |  |  | 455 |
|  | 15 |  |  | 451 |
|  | 16 |  |  | 25 |
| 15 | 4 |  |  | 62 |
|  | 5 |  |  | 441 |
|  | 15 |  |  | 456 |
|  | 16 |  |  | 25 |
| 16 | 4 |  |  | 0 |
|  | 5 |  |  | 25 |
|  | 15 |  |  | 0 |
|  | 16 |  |  | 0 |
| H | 4 |  |  | 25 |
|  | 5 |  |  | 410 |
|  | 15 |  |  | 441 |
|  | 16 |  |  | 25 |
| 4 | 4 | 0 | 4 | 21 |
|  | 5 |  |  | 0 |
|  | 15 |  |  | 0 |
|  | 16 |  |  | 20 |
| 5 | 4 |  |  | 0 |
|  | 5 |  |  | 441 |
|  | 15 |  |  | 510 |
|  | 16 |  |  | 210 |
| 15 | 4 |  |  | 32 |
|  | 5 |  |  | 440 |
|  | 15 |  |  | 411 |
|  | 16 |  |  | 25 |
| 16 | 4 |  |  | 1 |
|  | 5 |  |  | 0 |
|  | 15 |  |  | 0 |
|  | 16 |  |  | 0 |
| H | 4 |  |  | 255 |
|  | 5 |  |  | 441 |
|  | 15 |  |  | 551 |
|  | 16 |  |  | 25 |

R₁*: Number of carbon atoms in R₁
R₂**: Number of carbon atoms in R₂
E***: Cell voltage

TABLE 26

| R₁* or H | R₂** | n | m | E*** |
|---|---|---|---|---|
| 4 | 4 | 0 | 5 | 25 |
|  | 5 |  |  | 21 |
|  | 15 |  |  | 21 |
|  | 16 |  |  | 25 |
| 5 | 4 |  |  | 25 |
|  | 5 |  |  | 410 |

TABLE 26-continued

| R₁* or H | R₂** | n | m | E*** |
|---|---|---|---|---|
|  | 15 |  |  | 412 |
|  | 16 |  |  | 2 |
| 15 | 4 |  |  | 14 |
|  | 5 |  |  | 413 |
|  | 15 |  |  | 412 |
|  | 16 |  |  | 251 |
| 16 | 4 |  |  | 25 |
|  | 5 |  |  | 25 |
|  | 15 |  |  | 2 |
|  | 16 |  |  | 25 |
| H | 4 |  |  | 254 |
|  | 5 |  |  | 456 |
|  | 15 |  |  | 411 |
|  | 16 |  |  | 25 |
| 4 | 4 | 1 | 5 | 23 |
|  | 5 |  |  | 0 |
|  | 15 |  |  | 1 |
|  | 16 |  |  | 0 |
| 5 | 4 |  |  | 0 |
|  | 5 |  |  | 0 |
|  | 15 |  |  | 0 |
|  | 16 |  |  | 14 |
| 15 | 4 |  |  | 0 |
|  | 5 |  |  | 0 |
|  | 15 |  |  | 0 |
|  | 16 |  |  | 0 |
| 16 | 4 |  |  | 25 |
|  | 5 |  |  | 0 |
|  | 15 |  |  | 0 |
|  | 16 |  |  | 0 |
| H | 4 |  |  | 0 |
|  | 5 |  |  | 0 |
|  | 15 |  |  | 0 |
|  | 16 |  |  | 2 |

R₁*: Number of carbon atoms in R₁
R₂**: Number of carbon atoms in R₂
E***: Cell voltage The above results show that, when $R^1$ and $R^2$ are independently hydrogen or an alkyl group having not less than 5 and not more than 15 carbon atoms, and n and m satisfied $0 \leq n \leq 5$, $0 \leq m \leq 5$ and $1 \leq n+m \leq 5$, the discharge performance was high and a cell voltage of not less than 400 mV was obtained. When each parameter was out of the above range, on the other hand, the cell voltage was not more than 500 mV.

Further, when the same discharge test was conducted on Cell 2 using a conventional surfactant, a cell voltage of 415 mV was obtained.

It is understood from the above that the use of the surfactant of the present invention secures cell characteristics better than or equivalent to the characteristics of a cell using the conventional surfactant having the endocrine-disrupting function, without impairing dispersibility of the water-repellent polymer.

TEST EXAMPLE 1

An alkylene oxide type surfactant represented by the formula:

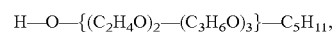

and octyl phenol ethoxylate (Triton X-100, produced by NAGASE & CO., LTD.) were subjected to a thermal decomposition behavior analysis (TG-MS). They were each heated in the air to raise the temperature thereof from room temperature to 300° C., retained at 300° C. for 120 minutes, and then heated to 400° C. they were then cooled down and the residues thereof subjected to an infrared spectroscopic analysis (FT-IR).

The respective amounts of the residues of the alkylene oxide type surfactant and the octyl phenol ethoxylate were about 0.09 wt % and about 1.1 wt %.

While the residue of the alkylene oxide type surfactant was a simple hydrocarbon component, a component having benzene-ring structure was detected from the residue of octyl phenol ethoxylate. It was concluded from this result that a phenol group was from the octyl phenol ethoxylate.

This result further indicates that the conventional surfactant (octyl phenol ethoxylate) may be incompletely decomposed by a normal thermal treatment at 290° C. to 380° C. with a hot air dryer, and hence the problematic phenol group was left therein. Accordingly, even when the normal thermal treatment as above described was conducted on an MEA and an electrode using the conventional surfactant, the environmental hormone component cannot be completely removed therefrom. As a result, the environmental hormone component may be left in the product, which requires a special treatment for safely treating the environmental hormone component at the time of waste disposal of the product.

On the other hand, in an MEA and an electrode using the alkylene oxide type surfactant of the present invention, the surfactant is removed by a simple thermal treatment and no problematic component remains, ensuring safety of the product. Therefore, the special treatment is unnecessary at the time of waste disposal of the product, and hence reduction in total cost while considering the life cycle of the product is possible.

It is to be noted that, although the pure hydrogen gas was used as the fuel in Example 1, similar results were obtained by using reformed hydrogen containing impurities such as carbon dioxide, nitrogen and carbon monoxide. Further, although the methanol aqueous solution was used as the fuel in Example 2, similar results were obtained by using liquid fuels such as ethanol and dimethyl ether, and a mixture thereof. The liquid fuel may be evaporated in advance and then supplied as a vapor. In Examples 1 and 2, the gas diffusion layer was produced with the use of acetylene black and carbon paper; however, the materials are not limited to these. Similar effects were obtained by using carbon black, carbon cloth and the like. Further, the constitution of the present invention is not limited by the catalyst layer, the electrolyte membrane and the like used in Examples. A variety of catalyst layers, electrolyte membranes and the like can be used. Moreover, the MEA in accordance with the present invention is applicable to a generator of such gas as oxygen, ozone and hydrogen, a purifier, and a variety of gas sensors such as an oxygen sensor and an alcohol sensor.

REFERENCE EXAMPLE 1

(i) Production of Gas Diffusion Layer

Acetylene black as conductive carbon particles (Denka black with a particle size of 35 nm, produced by DENKI KAGAKU KOGYO KABUSHIKI KAISHA) was mixed with a PTFE aqueous dispersion (D-1, produced by DAIKIN INDUSTRIES, LTD.) to prepare a water-repellent ink. The content of PTFE in the water-repellent ink was 20 parts by weight per 100 parts by weight of acetylene black.

Next, the water-repellent ink was applied onto the surface of carbon paper (TGPH060H, produced by Toray Industries, Inc.) as a substrate of a gas diffusion layer at a rate of 30 g/m$^2$ so that the water-repellent ink was impregnated in the carbon paper. The carbon paper with the water-repellent ink impregnated therein was then placed in air atmosphere and heat-treated at 300° C. with a hot air dryer to produce a gas diffusion layer.

(ii) Formation of Catalyst Layer 50 parts by weight of platinum particles having a mean particle size of about 30 angstroms were carried on 100 parts by weight of conductive carbon particles (Ketjen Black EC, produced by Ketjen Black International Company) having a mean particle size of 30 nm. The carbon particles carrying the platinum particles thereon, an alcohol dispersion of a hydrogen ion-conductive polymer electrolyte and a metal oxide powder were then mixed to prepare a catalyst ink. The weight ratio of the carbon particles carrying the platinum particles thereon to the hydrogen ion-conductive polymer electrolyte was 66:33. The hydrogen ion-conductive polymer electrolyte used was perfluorocarbon sulfonic acid ionomer (5 wt % Nafion dispersion, produced by Aldrich in the US). The metal oxide powder used was silica ($SiO_2$), titania ($TiO_2$), alumina ($Al_2O_3$), zirconia ($ZrO_2$), magnesia (MgO) or chromia ($Cr_2O_3$) each having a mean particle size of 0.8 μm. The content of the oxide powder in the catalyst ink was 1 to 10,000 ppm with respect to the solid matter.

Subsequently, the catalyst ink was printed on one face of the gas diffusion layer and then dried at 70° C. to form a catalyst layer with a thickness of 10 μm. As thus described, an electrode comprising the catalyst layer and the gas diffusion layer was produced.

(iii) Production of MEA-a

A hydrogen ion-conductive polymer electrolyte membrane (Nafion 112, produced by Du Pont in the US) was interposed between a pair of electrodes such that the catalyst layer sides were directed inwardly, and then hot pressed to produce MEA-a.

(iv) Assembly of Fuel Cell

A rubber gasket was bonded to the periphery of the electrolyte membrane of MEA-a and manifold holes for passage of cooling water, a fuel gas and an oxidant gas were formed therethrough.

Meanwhile, a variety of separators made of phenol resin-impregnated graphite plate with an external size of 20 cm×32 cm, a thickness of 1.3 mm and a depth of the gas flow channel or cooling water channel thereon of 0.5 mm were prepared.

The gas flow channel side of the separator with an oxidant gas flow channel was attached to the cathode side of MEA-a, while the gas flow channel side of the separator with a fuel gas flow channel was attached to the anode side of MEA-a, to constitute a unit cell.

Subsequently, two unit cells were stacked and then interposed between a pair of separators with cooling water flow channels formed thereon such that the cooling water flow channel sides of the separators were directed inwardly. This pattern was repeated to produce a cell stack of 100 cells. A current collector plate made of stainless steel and an insulating plate made of an electrically-insulating material were arranged on both ends of the cell stack, and further, with the use of end plates and tie rods, the whole was assembled. The clamping pressure per area of the separator was 15 kgf/cm$^2$. The cell thus produced was referred to as Cell A.

(v) Evaluation Test

A pure hydrogen gas and air were supplied to the anode and the cathode of Cell A, respectively, at a cell temperature of 75° C. and at a fuel gas utilization rate (Uf) of 70% and an air utilization rate (Uo) of 40%. A discharge test was conducted on the cell. The gases were humidified by passage of the pure hydrogen gas through a bubbler at 70° C. and by passage of the air through a bubbler at 50° C.

Next, 2 mol/l of methanol aqueous solution at a temperature of 60° C. was supplied to the anode of Cell A at a cell temperature of 75° C. and under an air utilization rate (Uo) of 40%. The gas was humidified by passage of the air through a bubbler at 50° C. A discharge test was conducted on the cell.

REFERENCE EXAMPLE 2

(i) Production of Gas Diffusion Layer

Acetylene black as conductive carbon particles (Denka black with a particle size of 35 nm, produced by DENKI KAGAKU KOGYO KABUSHIKI KAISHA), a PTFE aqueous dispersion (D-1, produced by DAIKIN INDUSTRIES, LTD.) and a metal oxide powder were mixed to prepare a water-repellent ink. The content of PTFE in the water-repellent ink was 20 parts by weight per 100 parts by weight of acetylene black. The metal oxide powder used was silica ($SiO_2$), titania ($TiO_2$), alumina ($Al_2O_3$), zirconia ($ZrO_2$), magnesia (MgO) or chromia ($Cr_2O_3$), each having a mean particle size of 0.8 μm. The content of the oxide powder in the water-repellent ink was 1 to 10,000 ppm with respect to the solid matter.

Next, the water-repellent ink was applied onto the surface of carbon paper (TGPH060H, produced by Toray Industries, Inc.) as a substrate of a gas diffusion layer at a rate of 30 g/m$^2$ so that the water-repellent ink was impregnated in the carbon paper. The carbon paper with the water-repellent ink impregnated therein was then placed in air atmosphere and heat-treated at 300° C. with a hot air dryer to produce a gas diffusion layer.

(ii) Formation of Catalyst Layer 50 parts by weight of platinum particles having a mean particle size of about 30 angstroms were carried on 100 parts by weight of conductive carbon particles (Ketjen Black EC, produced by Ketjen Black International Company) having a mean particle size of 30 mm. The carbon particles carrying the platinum particles thereon was then mixed with an alcohol dispersion of a hydrogen ion-conductive polymer electrolyte to prepare a catalyst ink. The mixing ratio of the carbon particles carrying the platinum particles thereon to the hydrogen ion-conductive polymer electrolyte was 66:33. The hydrogen ion-conductive polymer electrolyte used was perfluorocarbon sulfonic acid ionomer (5 wt % Nafion dispersion, produced by Aldrich in the US). Subsequently, the catalyst ink was printed on one face of the gas diff-union layer and then dried at 70° C. to form a catalyst layer with a thickness of 10 μm. As thus described, an electrode comprising the catalyst layer and the gas diffusion layer was produced.

(iii) Production of MEA-b

A hydrogen ion-conductive polymer electrolyte membrane (Nafion 112, produced by Du Pont in the US) was interposed between a pair of electrodes such that the catalyst layer sides were directed inwardly, and then hot pressed to produce MEA-b.

(iv) Assembly of Fuel Cell

Cell B comprising a cell stack of 100 cells was produced in the same manner as in Reference Example 1.

(v) Evaluation Test

The same discharge test as in Reference Example 1 was conducted on Cell B.

REFERENCE EXAMPLE 3

(i) Production of MEA-c

MEA-c was produced in the same manner as in Reference Example 1 except that the water-repellent ink prepared in Reference Example 2 was used in place of the water-repellent ink prepared in Reference Example 1. In MEA-c, both a gas diffusion layer and a catalyst layer comprise a metal oxide powder. It should be noted that the same metal oxide powder was used for each MEA-c. Further, the gas diffusion layer and the catalyst layer contain the same amount of metal oxide powder.

(ii) Assembly of Fuel Cell

Cell C comprising a cell stack of 100 cells was produced in the same manner as in Reference Example 1.

(iii) Evaluation Test

The same discharge test as in Reference Example 1 was conducted on Cell C.

COMPARATIVE EXAMPLE 2

(i) Production of MEA-x

MEA-x was produced in the same manner as in Reference Example 1 except that the catalyst ink prepared in Reference Example 2 was used in place of the catalyst ink prepared in Reference Example 1. In MEA-x, neither the gas diffusion layer nor the catalyst layer comprises the metal oxide powder.

(ii) Assembly of Fuel Cell

Cell X comprising a cell stack of 100 cells was produced in the same manner as in Reference Example 1.

(iii) Evaluation Test

The same discharge test as in Reference Example 1 was conducted on Cell X.

RESULTS OF EVALUATION TESTS IN REFERENCE EXAMPLES 1 TO 3

(i) Hydrogen-Air Type Fuel Cell

Figure 4:
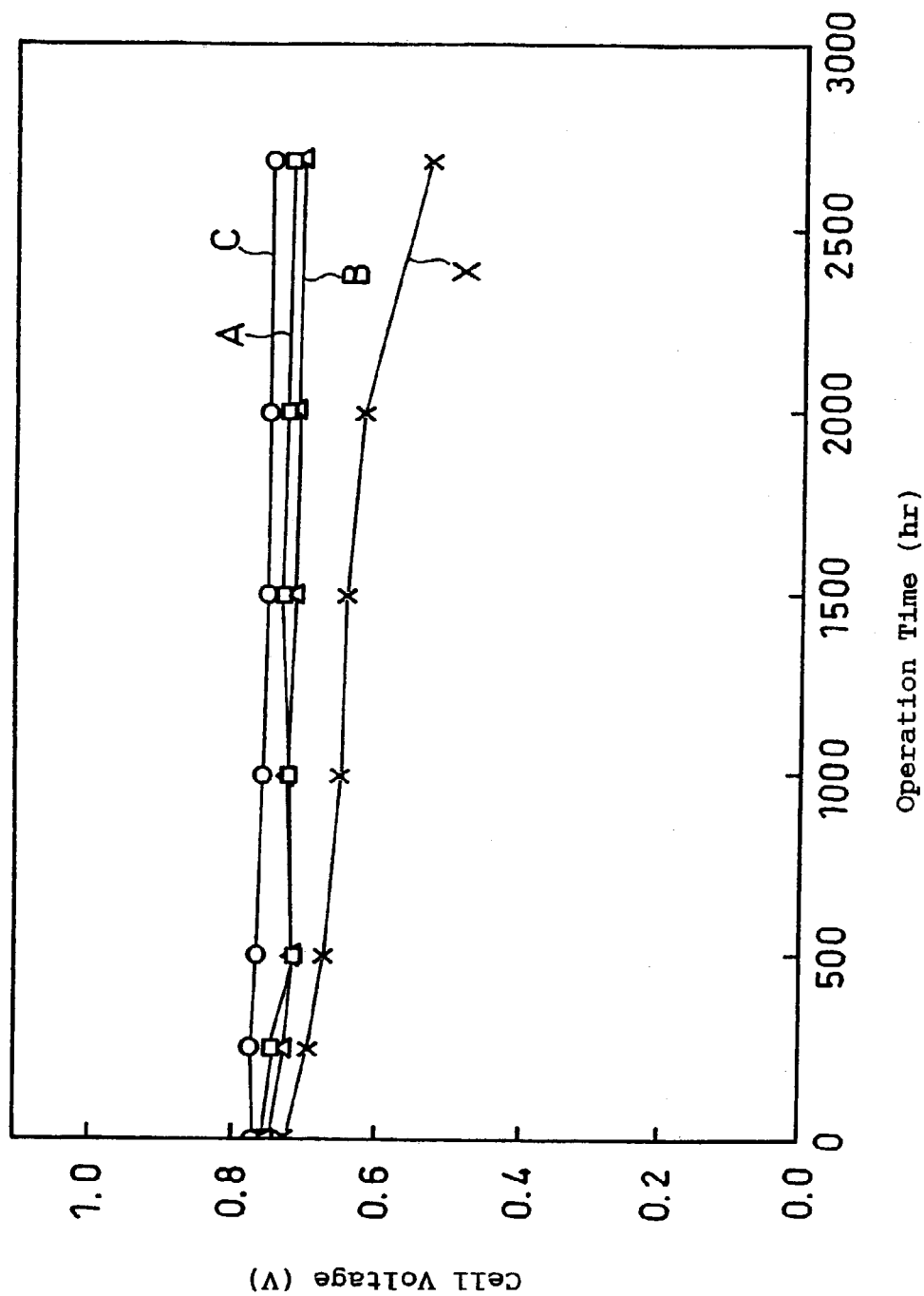
FIG. 4 is a voltage-operation time characteristic diagram of a hydrogen-air type fuel cell with the electrode thereof added with a metal oxide.

FIG. 4 shows a comparison of the life characteristics of hydrogen-air type fuel Cells A to C in Reference Examples to hydrogen-air type fuel Cell X in the Comparative Example. The fuel cells A to C used silica as the metal oxide powder, 10 ppm of metal oxide powder was contained in the catalyst layer and 10 ppm of metal oxide powder was contained in the gas diffusion layer.

FIG. 4 shows the relationship between the operation time of the cell in hours and the cell voltage at a current density of 300 mA/cm$^2$. As shown in FIG. 4, in the initial stage, the respective average voltages of Cells A, B, C and X are 759 mV, 747 mV, 768 mV and 726 mV, respectively. After 2,700 hours, they are 718 mV, 706 mV, 747 mV and 528 mV, respectively. The cell voltage of Cell X in the Comparative Example 2 declined by as much as 198 mV, while the voltages of Cells A, B and C in the Reference Examples decline only by 41 mV, 41 mV and 21 mV, respectively.

Accordingly, the inhibitory effect on deterioration was larger in the case of adding the metal oxide powder to the catalyst layer than in the case of adding the same to the gas diffusion layer. Further, in Cell C, where the metal oxide powder was added to both the catalyst layer and the gas diffusion layer, the least decline in voltage was observed. This is presumably a consequence of maintained hydrogen ion-conductivity, gas diffusibility and discharge ability of the water produced over a long period of time due to inhibition of deterioration in the water content of the polymer electrolyte of each layer and of deterioration in water repellency of the carbon particles.

(ii) Direct Type Methanol Fuel Cell

Figure 5:
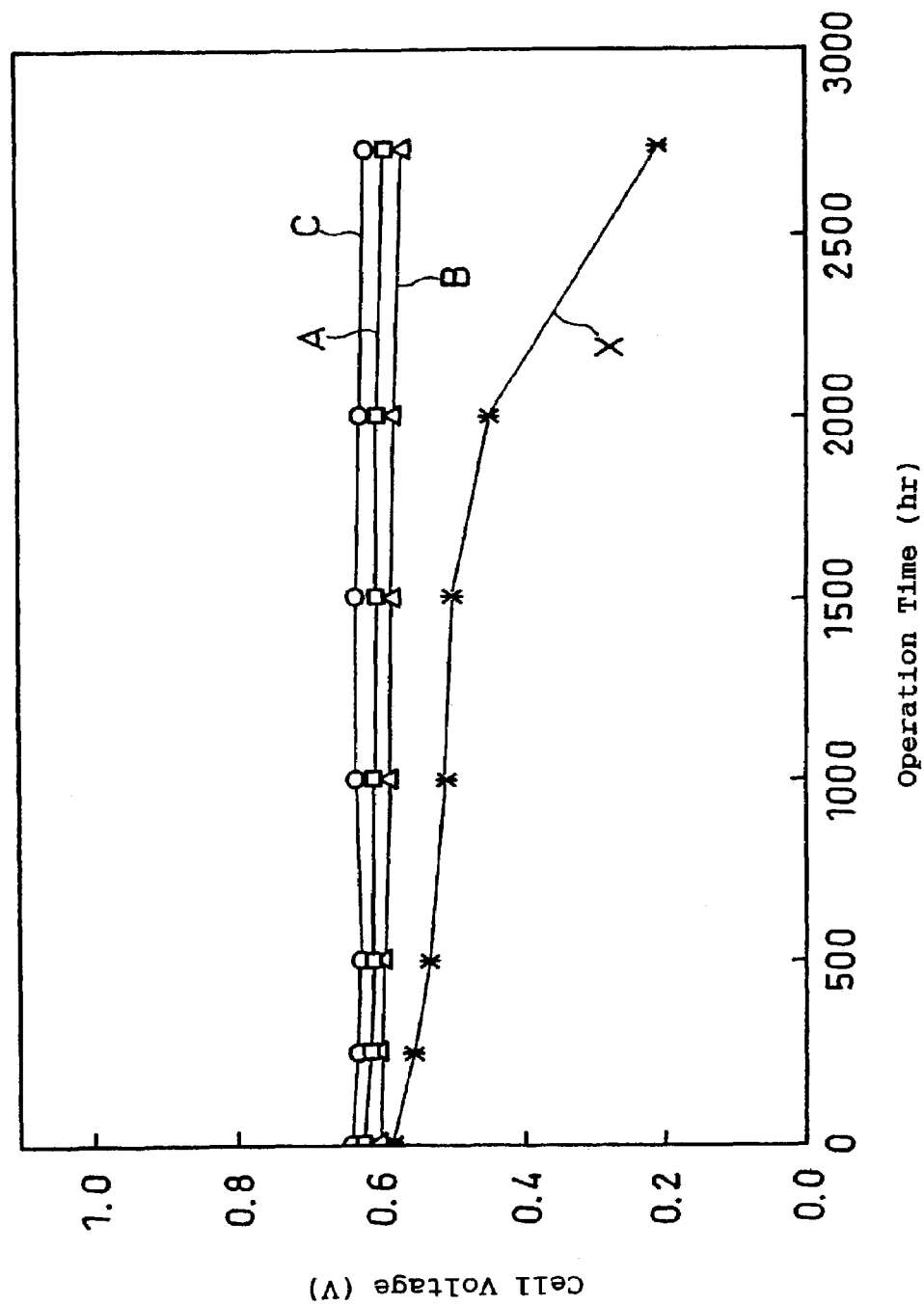
FIG. 5 is a voltage-operation time characteristic diagram of a direct type methanol fuel cell with the electrode thereof added with a metal oxide.

FIG. 5 shows one example of life characteristics of Cells A to C in the Reference Examples and of Cell X in the Comparative Example. The life characteristics were obtained when silica was used as the metal oxide powder. The catalyst layer contained 10 ppm of metal oxide powder while 10 ppm of metal oxide powder was contained in the gas diffusion layer.

In an MEA for a direct type methanol fuel cell, an anode-side catalyst layer was produced using carbon particles carrying platinum and ruthenium particles thereon in place of the carbon particles carrying the platinum particles only thereon. The carbon particles carrying the platinum and ruthenium particles thereon was prepared by contacting 100 parts by weight of conductive carbon particles (Ketjen Black EC, produced by Ketjen Black International Company) having a mean particle size of 30 nm with 40 parts by weight of platinum particles having a mean particle size of about 30 angstroms and 20 parts by weight of ruthenium particles having a mean particle size of about 30 angstroms.

FIG. 5 shows the relationship between the operation time of the cells and the voltages per one unit cell at a current density of 200 mA/cm$^2$. As shown in FIG. 5, in the initial stage, the respective average voltages of the unit cells of Cells A, B, C and X are 621 mV, 597 mV, 635 mV and 583 mV, respectively. After 2,700 hours, the respective average voltages are 589 mV, 568 mV, 618 mV and 210 mV. While the average voltage of Cell X in Comparative Example 2 declined by as much as 373 mV, the average voltages of Cells A, B and C in Reference Examples decline by only 32 mV, 29 mV and 17 mV, respectively.

From these results, it is clear that the direct type methanol fuel cell also exerts the inhibitory effect on deterioration in characteristics as a result of the inclusion of the metal oxide to the electrode.

(iii) Content of Metal Oxide in Hydrogen-Air Fuel Cell

Figure 6:
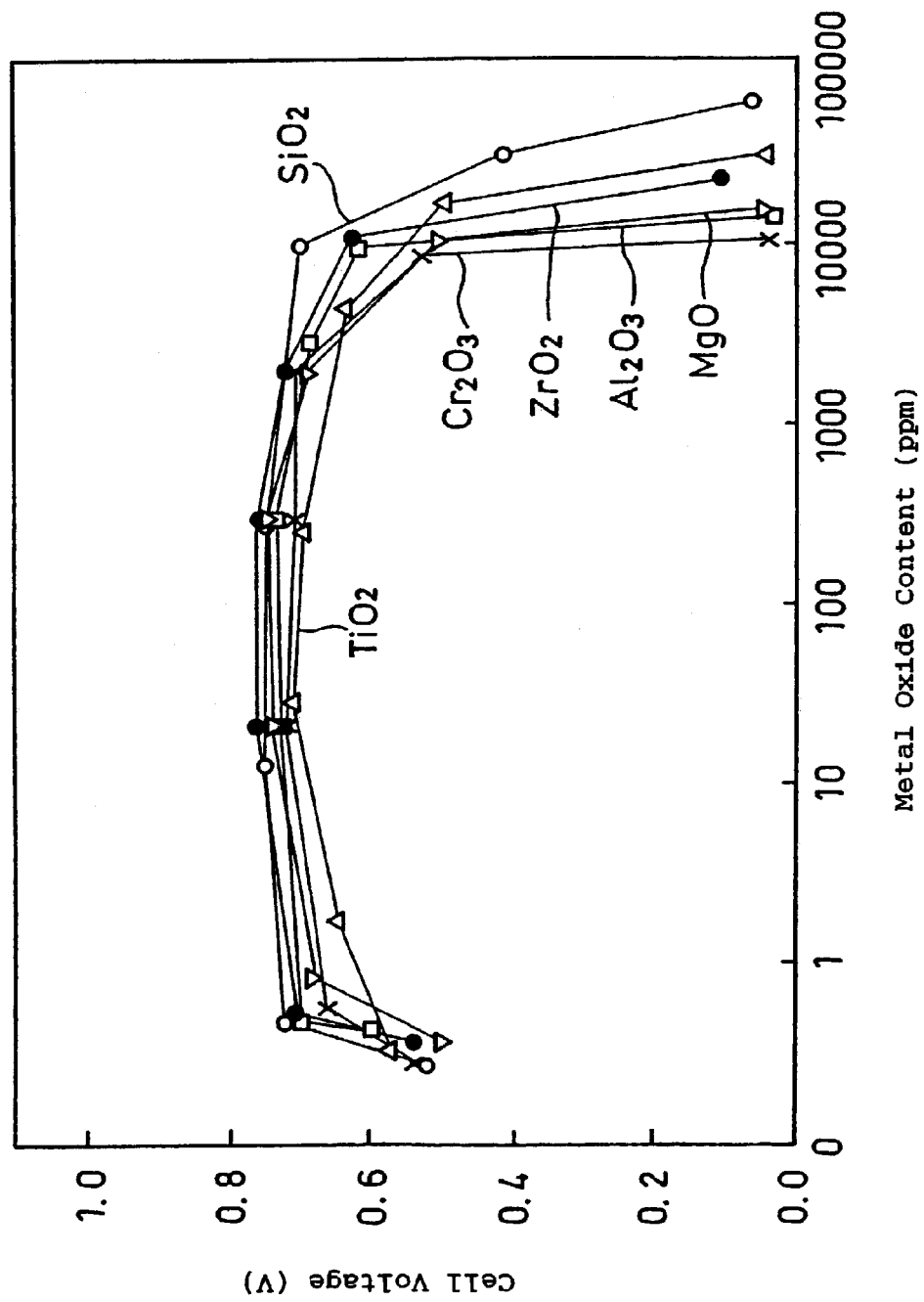
FIG. 6 is a diagram representing the relationship between the cell voltage and the metal oxide content of the electrode of a hydrogen-air type fuel cell.

FIG. 6 shows the relationship between the voltage of Cell C as the hydrogen-air fuel cell and the content of the metal oxide powder in the electrode. The abscissa of FIG. 6 shows the content of the metal oxide powder in the whole electrode. The ordinate of FIG. 6 shows the voltage per one unit cell at a current density of 280 mA/cm after 2,500 hours.

In FIG. 6, the cell voltage is kept high when the content of the metal oxide powder is in the range of 1 to 10,000 ppm, because of the effect of adding the metal oxide powder. The reason for the decline in cell voltage when the content of the metal oxide powder was more than 10,000 ppm is believed to be that, with the metal oxide being insulative, the internal resistance of the electrode increased.

The more favorable content of the metal oxide powder in the electrode in the case of silica ($SiO_2$), titania ($TiO_2$), alumina ($Al_2O_3$), zirconia ($ZrO_2$), magnesia (mGO) and chromia ($Cr_2O_3$) are 1 to 10,000 ppm, 3 to 4,000 ppm, 1 to 3,000 ppm, 1 to 10,000 ppm, 2 to 2,000 ppm and 1 to 2,000 ppm, respectively.

(iv) Content of Metal Oxide in Direct Type Methanol Fuel Cell

Figure 7:
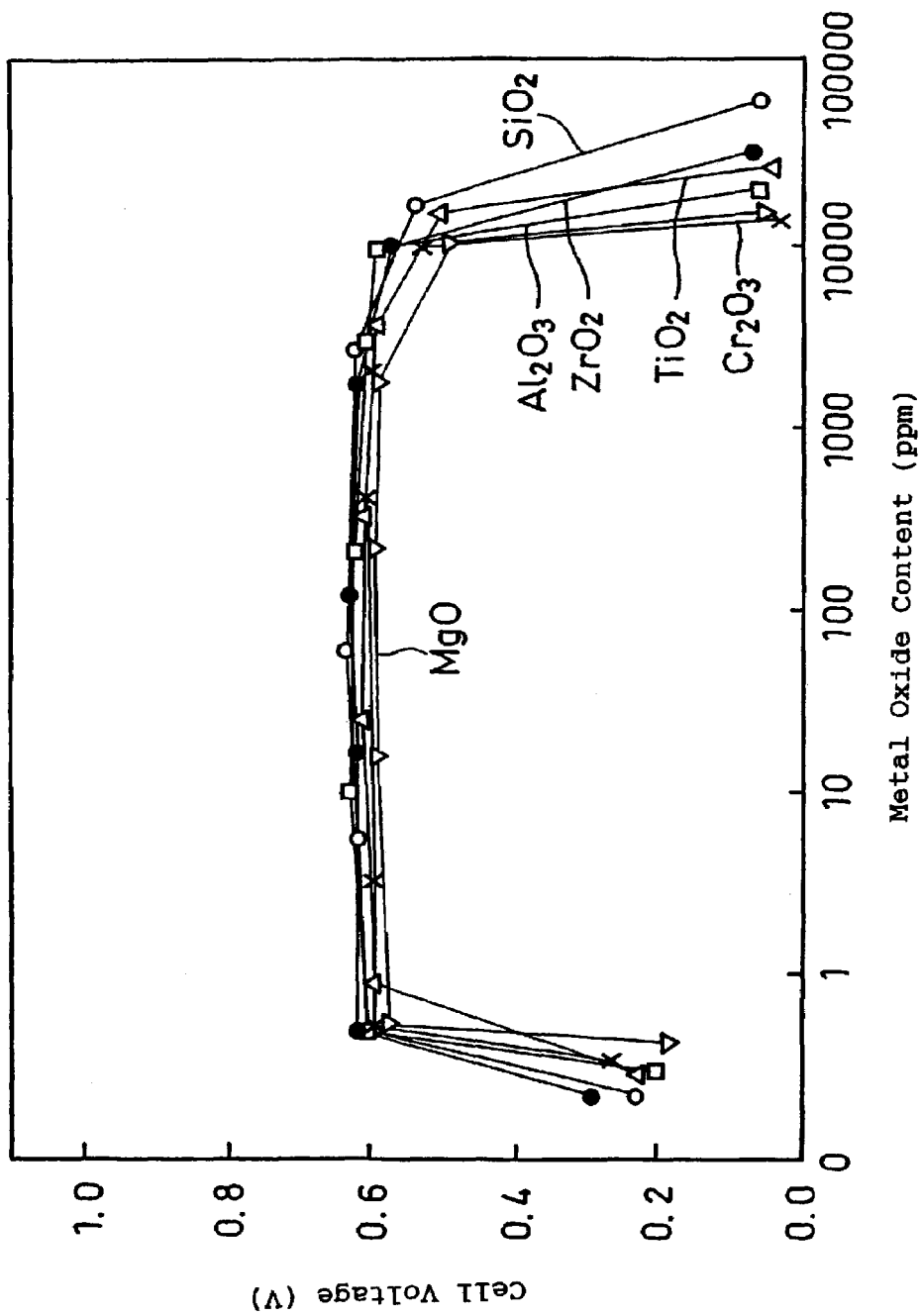
FIG. 7 is a diagram representing the relationship between the cell voltage and the metal oxide content of the direct type methanol fuel cell.

FIG. 7 shows the relationship between the voltage of Cell C as the direct type methanol fuel cell and the content of the metal oxide powder in the electrode. The abscissa of FIG. 7 shows the content of the metal oxide powder in the whole electrode. The ordinate of FIG. 7 shows the voltage per one unit cell at a current density of 180 mA/cm$^2$ after 2,500 hours.

In the MEA for a direct type methanol fuel cell, an anode-side catalyst layer was produced using carbon particles carrying platinum and ruthenium particles thereon in place of the carbon particles carrying the platinum particles only thereon. The carbon particles carrying the platinum and ruthenium particles thereon were prepared by contacting 100 parts by weight of conductive carbon particles (Ketjen Black EC, produced by Ketjen Black Intentional Company) having a mean particle size of 30 nm with 40 parts by weight of platinum particles having a mean particle size of about 30 angstroms and 20 parts by weight of ruthenium particles having a mean particle size of about 30 angstroms.

In FIG. 7, the cell voltage is kept high when the content of the metal oxide powder is in the range of 1 to 10,000 ppm because of the effect of adding the metal oxide powder is confirmed. The reason for the decline in cell voltage when the content of the metal oxide powder was more than 10,000 ppm is believed to be that, with the metal oxide being insulative, the internal resistance of the electrode increased.

The more favorable content of the metal oxide powder in the electrode in the case of silica ($SiO_2$), titania ($TiO_2$), alumina ($Al_2O_3$), zirconia ($ZrO_2$), magnesia (MgO) and chromia ($Cr_2O_3$) are 1 to 10,000 ppm, 2 to 4,000 ppm, 1 to 10,000 ppm, 1 to 10,000 ppm, 1 to 2,000 ppm and 2 to 10,000 ppm, respectively.

EXAMPLE 3

(i) Production of Gas Diffusion Layer

Acetylene black conductive carbon particles (Denka black having a particle size of 35 nm, produced by DENKI KAGAKU KOGYO KABUSHIKI KAISHA), an alkylene oxide type surfactant represented by the following formula:

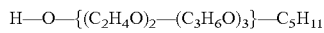

and a PTFE aqueous dispersion (D-1E, produced by DAIKIN INDUSTRIES, LTD.) were mixed to prepare a water-repellent ink A. The respective contents of the surfactant and the PTFE in the water-repellent ink A were 10 parts by weight and 20 parts by weight per 100 parts by weight of acetylene black.

Next, the water-repellent ink A was applied onto the surface of carbon paper (TGPH060H, produced by Toray Industries, Inc.) as a substrate for a gas diffusion layer. The ink was applied at a rate of 30 g/m² so that the water-repellent ink was impregnated in the carbon paper. The carbon paper with the water-repellent ink impregnated therein was then placed in air atmosphere and heat-treated at 350° C. with a hot air dryer to produce a gas diffusion layer.

(ii) Formation of Catalyst Layer 50 parts by weight of platinum particles having a mean particle size of about 30 angstroms were carried on 100 parts by weight of conductive carbon particles (Ketjen Black EC, produced by Ketjen Black Intentional Company) having a mean particle size of 30 nm. The carbon particles carrying the platinum particles, an alcohol dispersion of a hydrogen ion-conductive polymer electrolyte and a metal oxide powder were then mixed to prepare a catalyst ink. The weight ratio of the carbon particles carrying the platinum particles thereon and the hydrogen ion-conductive polymer electrolyte was 66:33. The hydrogen ion-conductive polymer electrolyte used was a perfluorocarbon sulfonic acid ionomer (5 wt % Nafion dispersion, produced by Aldrich in the US). The metal oxide powder used was selected from the group consisting of silica ($SiO_2$), titania ($TiO_2$), alumina ($Al_2O_3$), zirconia ($ZrO_2$), magnesia (MgO) and chromia ($Cr_2O_3$), each having a mean particle size of 0.8 µm. The content of the oxide powder in the catalyst ink was 1 to 10,000 ppm with respect to the solid matter.

The catalyst ink was printed on one face of the gas diff-union layer and then dried at 70° C. to form a catalyst layer having a thickness of 10 µm. As thus described, an electrode comprising the catalyst layer and a gas diffusion layer was produced.

(iii) Production of MEA

A hydrogen ion-conductive polymer electrolyte membrane (Nafion 112, produced by Du Pont in the US) was interposed between a pair of electrodes such that the catalyst layer sides were directed inwardly, and then hot pressed to produce MEA-A.

(iv) Assembly of Fuel Cell

Except that MEA-A was used in place of MEA-a, Cell A' comprising a cell stack of 100 cells was produced in the same manner as in Reference Example 1.

(v) Evaluation Test

The same discharge test as in Reference Example 1 was conducted on Cell A'.

EXAMPLE 4

(i) Production of Gas Diffusion Layer

The water-repellent ink A prepared in Example 3 was further mixed with a metal oxide powder to prepare a water-repellent ink B. The metal oxide powder used was selected from the group consisting of silica ($SiO_2$), titania ($TiO_2$), alumina ($Al_2O_3$), zirconia ($ZrO_2$), magnesia (MgO) and chromia ($Cr_2O_3$), each having a mean particle size of 0.8 µm. The content of the oxide powder in the catalyst ink B was 1 to 10,000 ppm with respect to the solid matter.

Next, the water-repellent ink B was applied onto the surface of carbon paper (TGPH060H, produced by Toray Industries, Inc.) as a substrate of a gas diffusion layer. The ink was applied at a rate of 30 g/m² so that the water-repellent ink was impregnated in the carbon paper. The carbon paper with the water-repellent ink impregnated therein was then placed in air atmosphere and heat-treated at 350° C. with a hot air dryer to produce a gas diffusion layer.

(ii) Formation of Catalyst Layer 50 parts by weight of platinum particles having a mean particle size of about 30 angstroms were carried on 100 parts by weight of conductive carbon particles (Ketjen Black EC, produced by Ketjen Black International Company) having a mean particle size of 30 nm. The carbon particles carrying the platinum particles thereon was then mixed with an alcohol dispersion of a hydrogen ion-conductive polymer electrolyte to prepare a catalyst ink. The weight ratio of the carbon particles carrying the platinum particles and the hydrogen ion-conductive polymer electrolyte was 66:33. As the hydrogen ion-conductive polymer electrolyte used was perfluorocarbon sulfonic acid ionomer (5 wt % Nafion dispersion, produced by Aldrich in the US). Subsequently, the catalyst ink was printed on one face of the gas diffusion layer and then dried at 70° C. to form a catalyst layer having a thickness of 10 µm. As thus described, an electrode comprising the catalyst layer and the gas diffusion layer was produced.

(iii) Production of MEA

A hydrogen ion-conductive polymer electrolyte membrane (Nafion 112, produced by Du Pont in the US) was interposed between a pair of electrodes such that the catalyst layer sides were directed inwardly, and then hot pressed to produce MEA-B.

(iv) Assembly of Fuel Cell

Except that MEA-B was used in place of MEA-A, Cell B' comprising a cell stack of 100 cells was produced in the same manner as in Reference Example 1.

(v) Evaluation Test

The same discharge test as in Reference Example 1 was conducted on Cell B'.

EXAMPLE 5

(i) Production of MEA

Except that the water-repellent ink B prepared in Example 4 was used in place of the water-repellent ink A prepared in Example 3, MEA-C was produced in the same manner as in Example 3. In MEA-C, both a gas diff-union layer and a catalyst layer comprise a metal oxide powder. It should be noted that the same metal oxide powder was used for each MEA-C. Further, the gas diffusion layer and the catalyst layer contain the same amount of metal oxide powder.

(ii) Assembly of Fuel Cell

Except that MEA-C was used in place of MEA-A, Cell C' comprising a cell stack of 100 cells was produced in the same manner as in Reference Example 1.

(iii) Evaluation Test

The same discharge test as in Reference Example 1 was conducted on Cell C'.

RESULTS OF EVALUATION TESTS IN EXAMPLES 3 TO 5

(i) Hydrogen-Air Type Fuel Cell

Life characteristics of Cells A' to C' in Examples as hydrogen-air type fuel cells were measured. The relationship between the operation time of the cells and the voltages per one unit cell were observed at a current density of 300 $mA/cm^2$.

When 10 ppm of silica was contained in the catalyst layer and 10 ppm of metal oxide powder was contained in the gas diffusion layer, the respective average voltages of the unit cells of Cells A', B' and C' in the initial stage were 757 mV, 745 mV and 765 mV, respectively. After 2,700 hours, they were 715 mV, 702 mV and 741 mV, respectively. Hence, the voltages of Cells A', B' and C' declined only by 42 mV, 43 mV and 24 mV, respectively.

It is understood from the above that the equivalent inhibitory effect to the one in Reference Examples on deterioration in characteristics can also be obtained when the alkylene oxide type surfactant was used.

(ii) Direct Type Methanol Fuel Cell

The life characteristics of Cells A' to C' in Examples as direct type methanol fuel cell were measured. The relationship between the operation time of the cells and the voltages per one unit cell were observed at a current density of 200 $mA/cm^2$.

In an MEA for the direct type methanol fuel cell, an anode-side catalyst layer was produced by the use of carbon particles carrying platinum and ruthenium particles thereon in place of the carbon particles carrying the platinum particles only thereon. The carbon particles carrying the platinum and ruthenium particles thereon was prepared by contacting 100 parts by weight of carbon particles (Ketjen Black EC, produced by Ketjen Black International Company) having a mean particle size of 30 nm with 40 parts by weight of platinum particles having a mean particle size of about 30 angstroms and 20 parts by weight of ruthenium particles having a mean particle size of about 30 angstroms.

When 10 ppm of silica was contained in the catalyst layer and 10 ppm of silica was contained in the gas diffusion layer, the respective average voltages of the unit cells of Cells A', B' and C' in the initial stage were 619 mV, 595 mV and 630 mV, respectively. After 2,700 hours, the respective average voltages were 582 mV, 562 mV and 612 mV.

Hence, the voltages of Cells A', B' and C' declined only by 37 mV, 33 mV and 18 mV, respectively.

The results above show that also in the direct type methanol fuel cell, the equivalent inhibitory effect to the one in Reference Examples on deterioration in characteristics is exhibited when the alkylene oxide type surfactant is used.

(iii) Content of Metal Oxide in Hydrogen-Air Fuel Cell

The relationship between the voltage of Cell C' as the hydrogen-air fuel cell and the amount of metal oxide powder in the electrode was observed. When the content of the metal oxide powder was in the range of 1 to 10,000 ppm the voltage per one unit cell at a current density of 280 $mA/cm^2$ after 2,500 hours was kept at the equivalent value to the one in Reference Example 3. Further, the more preferable amount of the metal oxide powder in the electrode was in the same range as in Reference Example 3.

(iv) Content of Metal Oxide in Direct Type Methanol Fuel Cell

The relationship between the voltage of Cell C' as the direct type methanol fuel cell and the content of the metal oxide powder in the electrode was observed. When the content of the metal oxide powder was in the range of 1 to 10,000 ppm, the voltage per one unit cell at a current density of 180 $mA/cm^2$ after 2,500 hours was kept at the equivalent value to the one in Reference Example 3. Further, the more preferable amount of the metal oxide powder in the electrode was in the same range as in Reference Example 3.

It must be noted that, although pure hydrogen or methanol was used as the fuel in Reference Examples 1 to 3, a similar result was obtained when using a fuel-reformed hydrogen containing impurities such as carbon dioxide, nitrogen and carbon monoxide. Further, similar results were also obtained when using ethanol, dimethyl ether and the mixture thereof in place of methanol. The liquid fuel may be evaporated in advance and then supplied to the cell as a vapor.

REFERENCE EXAMPLE 4

(i) Formation of Catalyst Layer 50 parts by weight of platinum particles having a mean particle size of about 30 angstroms were carried on 50 parts by weight of conductive carbon particles (Ketjen Black EC, produced by AKZO Chemise in Holland) having a mean primary particle size of 30 nm. The carbon particles carrying the platinum particles thereon, an alcohol dispersion of a hydrogen ion-conductive polymer electrolyte and a predetermined amount of water were then mixed with the use of a beads mill disperser (Dispersant SLY-C12Z, produced by GETZMANN in Germany), to prepare catalyst inks A, B, C, D and E which contained different amounts of the solid matter. The weight ratio of the carbon particles carrying the platinum particles and the hydrogen ion-conductive polymer electrolyte was 100:50. The hydrogen ion-conductive polymer electrolyte used was perfluorocarbon sulfonic acid (5 wt % Nafion dispersion, produced by Aldrich in the US).

The content of the solid matter is a percentage value obtained by dividing the total weight of the conductive carbon particles, the platinum particles and the hydrogen ion-conductive polymer electrolyte in the catalyst ink by the weight of the catalyst ink and then multiplying the obtained value by 100. The content of the solid matter in the catalyst inks A, B, C, D and E were 20 wt %, 18 wt %, 15 wt %, 12 wt % and 5 wt %, respectively.

These catalyst inks were placed in a viscoelasticity measuring device (Reo stress RS 150, produced by HAAKE in Germany) to measure the viscosities of the ink. The shear rate was changed using a corn plate-type measuring head. The relationship between the shear rates and the viscosities is shown in FIG. 8.

Figure 8:
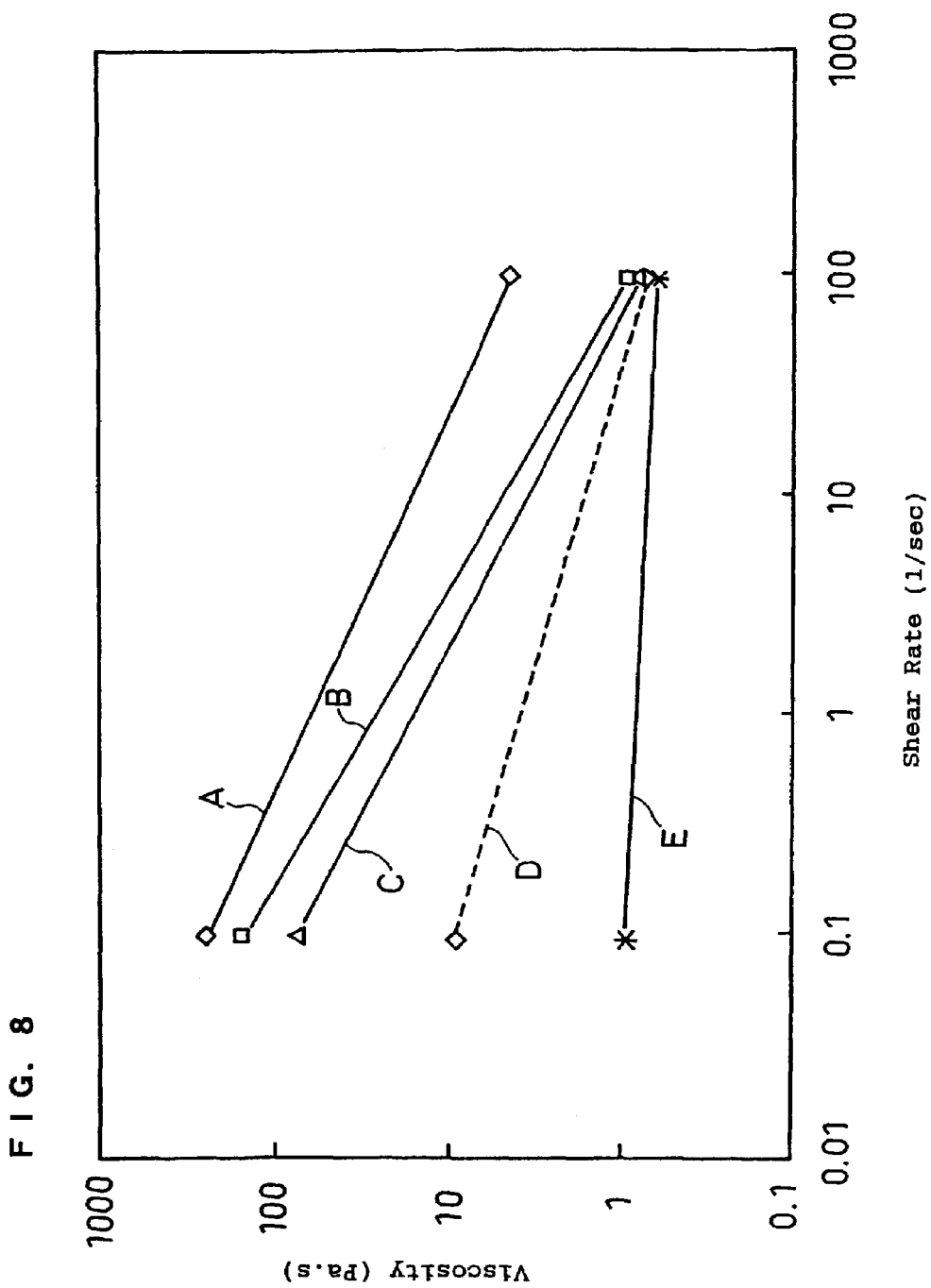
FIG. 8 is a diagram representing relationship between viscosities and shear rates of catalyst ink.

FIG. 8 shows that catalyst inks A, B, C and D exhibit behavior of a Non-Newtonian liquid, the viscosity of which decreased with increase in shear rate. On the other hand, catalyst ink E exhibited behavior of a Newtonian liquid, the viscosity of which hardly changed even with changes in shear rate.

These inks were applied onto a substrate using a coating apparatus as shown in FIG. 3. The substrate used was a film made of polyethylene terephthalate (hereinafter referred to as PET) (thickness: 50 μm, width: 250 mm). After catalyst ink 36 was put into a coat material tank 32, the PET film 34 was supplied from a wind-off part 33 of the coating apparatus. The catalyst ink was applied onto the substrate 34 from a tank 32 through a nozzle 37. The coating applied onto the substrate was dried as passing though a drying room 38 at a preset temperature of 60° C. In the same manner, catalyst layers A, B, C, D and E were each formed on the substrate 34.

When catalyst ink A was used, the coating streaked or became uneven because of the excessively high ink viscosity. When catalyst ink E was used, the ink dripped from the tip of the nozzle in the reverse direction of movement of the substrate. Further, the coating of ink E flowed in the width direction, making the applying extremely unstable. When catalyst inks B, C and D were used, the applying can be conducted stably without unevenness of the coating.

The relationship among the various catalyst ink compositions, the viscosities of the ink at shear rate of 0.1 (1/sec) and 100 (1/sec), and the stabilities of the applying are summarized in Table 27:

TABLE 27

| Catalyst Ink | Shear Rate 0.1 (1/s) | Shear Rate 100 (1/s) | Stability |
|---|---|---|---|
| A | 250 Pa·s | 5 Pa·s | Deteriorated |
| B | 150 Pa·s | 1 Pa·s | Good |
| C | 80 Pa·s | 0.9 Pa·s | Good |
| D | 10 Pa·s | 0.8 Pa·s | Good |
| E | 1 Pa·s | 0.7 Pa·s | Deteriorated |

It is understood from Table 27 that, with catalyst ink E having a viscosity of less than 10 Pa·s at a shear rate of 0.1 (1/sec) and with catalyst ink A having a viscosity of more than 1 Pa·s at a shear rate of 100 (1/sec), an even coating cannot be formed.

(ii) Production of Unit Cell

A hydrogen ion-conductive polymer electrolyte membrane (Nafion 112, produced by Du Pont in the US) was interposed between a pair of catalyst layers A and then hot pressed. The electrolyte membrane-catalyst layer A assembly was then interposed between a pair of carbon paper (TGP-H-120, produced by Toray Industries, Inc.) to produce unit cell A. In the same manner, unit cells B to E were produced using the catalyst layers B to E.

(iii) Evaluation of Unit Cell

Unit cells A to E were set in a test device to study characteristics of each unit cell. An anode of each unit cell was supplied with a simulated reformed gas (a hydrogen balanced gas containing 25% of carbon oxide and 50 ppm of carbon monoxide) and a cathode was supplied with air, and a discharge test was conducted on the cells at a cell temperature of 80° C. and under conditions of a fuel utilization rate of 80% and an air utilization rate of 40%. Each gas was humidified such that the dew point of the simulated reformed gas was 75° C. and the dew point of the air was 60° C.

Figure 9:
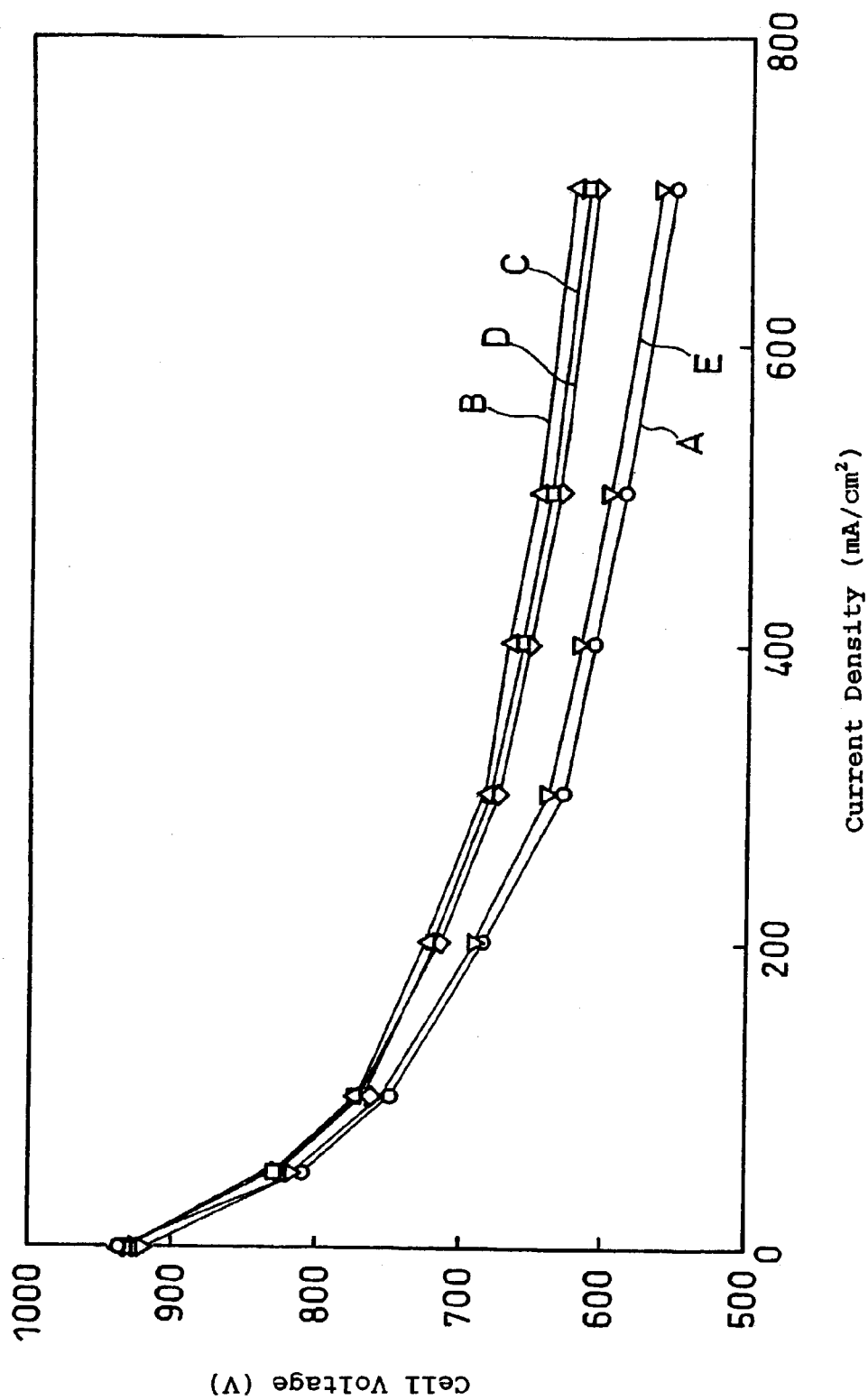
FIG. 9 is a current-voltage characteristic diagram of unit cells A to E.

FIG. 9 shows the comparison among current-voltage characteristics of unit cells A to E. FIG. 9 shows that unit cells A and E, using the uneven catalyst layer A and catalyst layer E formed from catalyst ink A and E which are unstable in applying, have lower cell characteristics than the other unit cells.

It is therefore possible to form an even coating stably by using a catalyst ink of a Non-Newtonian liquid having a viscosity of not less than 10 Pa·s at a shear rate of 0.1 (1/sec) and a viscosity of not more than 1 Pa·s at a shear rate of 100 (1/sec). Further, a fuel cell produced with the use of the catalyst ink of the Non-Newtonian liquid performs favorably.

REFERENCE EXAMPLE 5

(i) Formation of Catalyst Layer

Figure 10:
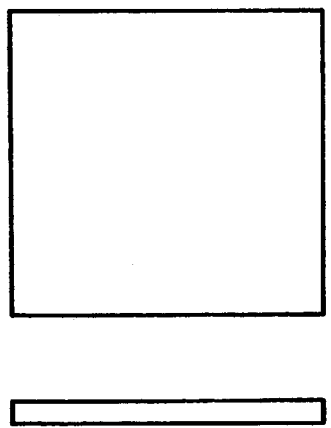
FIG. 10 is a view representing the appearance (a) and the cross section (b) of the catalyst layer C1 to C5.
Figure 10:
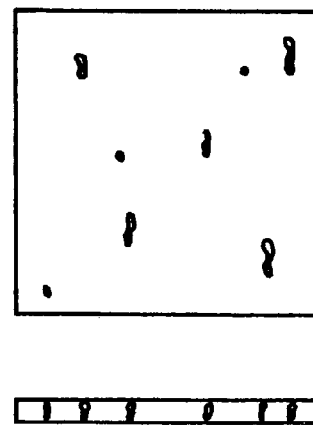
Figure 10:
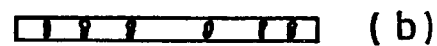

Using catalyst ink C prepared in Reference Example 4, the ink was applied onto a substrate in the same manner as in Reference Example 4. However, by setting a drying temperature for the coating at 30° C., 40° C., 60° C., 100° C. and 130° C., catalyst layers C1, C2, C3, C4 or C5 were formed. The appearances of catalyst layers C1 to C4 were almost the same. On part of catalyst layer C5, however, a crack was observed. The appearance (a) and the cross section (b) of catalyst layers C1 to C5 are shown in FIG. 10.

(ii) Production of Unit Cell

Using these catalyst layers C1 to C5, unit cells C1 to C5 were produced and then the cell characteristics thereof were studied in the same manner as in Reference Example 4.

(iii) Evaluation of unit cell

A condition for a test on the unit cells was the same as in Reference Example 4. The current-voltage characteristics of these unit cells are shown in FIG. 1.

Figure 11:
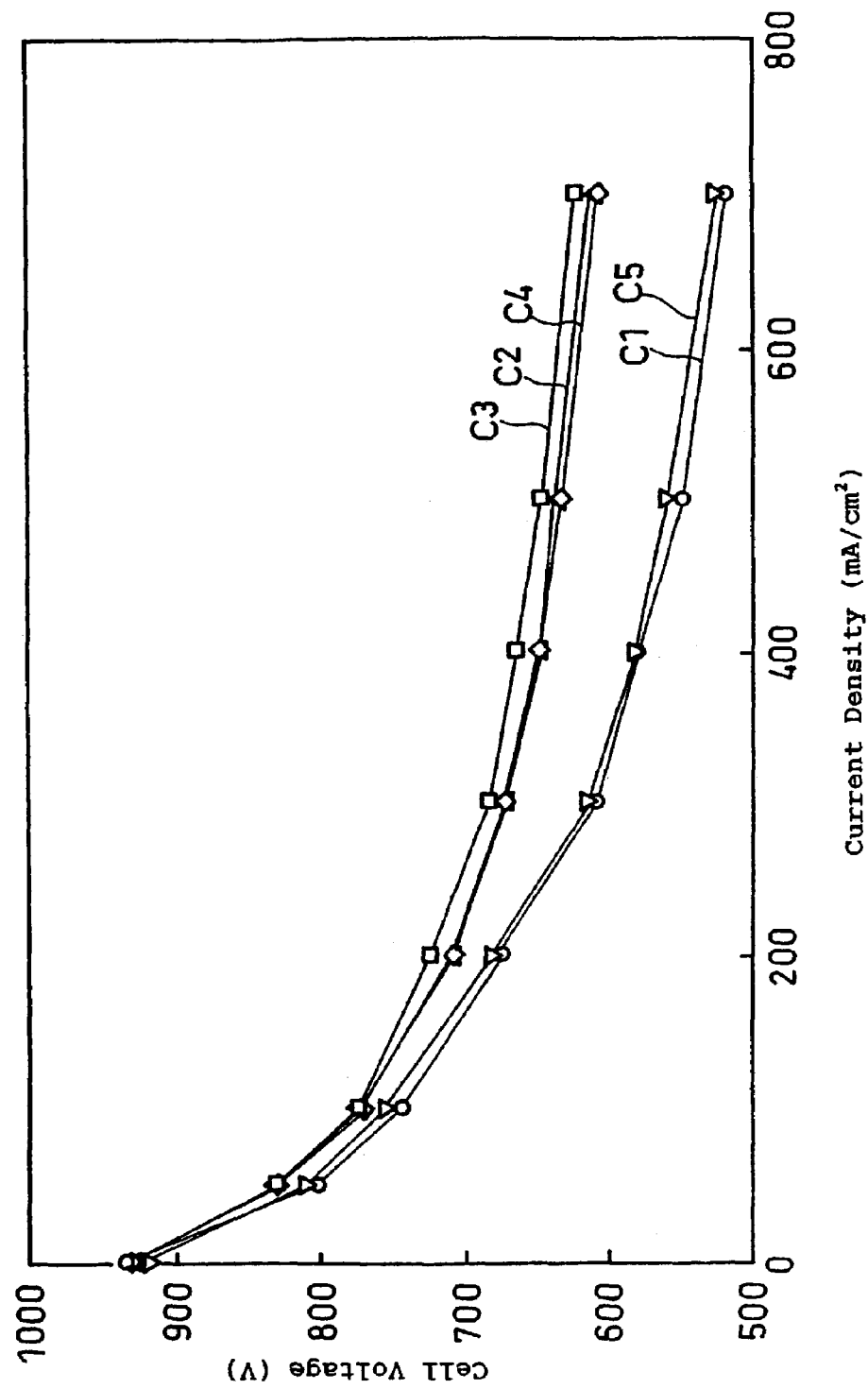
FIG. 11 is a current-voltage characteristic diagram of unit cells C1 to C5.

FIG. 11 shows that unit cell C1 using catalyst layer C1 and unit cell C5 using catalyst layer C5 have lower characteristics than the other unit cells. This is presumably because, in the case of catalyst layer C1, the dispersion medium of the ink was left in the catalyst layer due to the low drying temperature of 30° C. In the case of catalyst layer C5, the lower characteristic is presumably due to the drying temperature set to be as high as 130° C., causing the hydrogen ion-conductive polymer electrolyte in the catalyst layer to be altered such that there is a decrease in hydrogen ion-conductivity thereof and because of a crack in the catalyst layer, thereby deteriorating the cell characteristics.

It is therefore possible to stably produce a high-performance fuel cell by controlling the drying temperature for the catalyst ink after application. Although the drying was conducted at one stage in the present example, it can be conducted at plural stages by changing the drying temperature.

EXAMPLE 6

(i) Production of Gas Diffusion Layer 100 parts by weight of acetylene black as conductive carbon particles (Denka black with a particle size of 35 nm, produced by DENKI KAGAKU KOGYO KABUSHIKI KAISHA), 10 parts by weight of alkylene oxide type surfactant represented by the following formula:

and a PTFE aqueous dispersion (D-1E, produced by DAIKIN INDUSTRIES, LTD.) containing 20 parts by weight of PTFE were mixed to prepare a water-repellent ink.

Next, the water-repellent ink was applied to the surface of carbon paper (TGP-H-120, produced by Toray Industries, Inc.) as a substrate of a gas diff-union layer at a rate of 30 g/m² so that the water-repellent ink was impregnated in the carbon paper. The carbon paper with the water-repellent ink impregnated therein was then placed in air atmosphere and heat-treated at 350° C. with a hot air dryer to produce a gas diffusion layer.

(ii) Production of Unit Cell

Except that the above gas diffusion layer was used in place of the carbon paper, unit cells C1' to C5' using catalyst layers C1 to C5 were produced in the same manner as in Reference Example 5.

(iii) Evaluation of Unit Cell

A condition for a test on the unit cells was, the same as in Reference Example 4. As a result, in unit cells C1' to C5', current-voltage characteristics almost equivalent to those of unit cells C1 to C5 were obtained.

It should be noted that, although the beads mill was used as a device to grind and disperse the catalyst ink in the above, a roll mill, a homogenizer, a ball mill and the like can also be used. Further, although the viscosity of the ink was adjusted by changing the content of the solid matter of the catalyst ink in the above, the viscosity of the ink can also be adjusted by changing the dispersed matter's condition of the catalyst ink while keeping the content of the solid matter constant. Moreover, the viscosity of the ink can also be adjusted by using a method such as changing the composition of the solid matter. In the application method of the catalyst ink, a screen-printing, a gravure-printing and the like can also be applied. Furthermore, although the PET film was used as the substrate onto which the catalyst ink was applied, the ink can directly be applied onto the polymer electrolyte membrane and the gas diffusion layer.

INDUSTRIAL APPLICABILITY

According to the present invention, by optimizing a surfactant for the purpose of improving dispersibility of a water-repellent polymer and a binder in a gas diffusion layer of an electrode of a fuel cell, it is possible to improve safety of the product and the production process of the fuel cell and also to reduce the variation and defect of the coating of the water-repellent ink in the production process. Moreover, according to the present invention, by optimizing the water content of the electrode of the fuel cell, it is possible to further enhance the cell performance. Furthermore, according to the present invention, by controlling the viscosity of a catalyst ink with the solid matter content, it is possible to obtain a fuel cell having a catalyst layer in which catalyst particles are evenly distributed along the plane thereof, without using a thickener or heating.

The invention claimed is:

1. A polymer electrolyte fuel cell comprising: a hydrogen ion-conductive polymer electrolyte membrane; an anode and a cathode with said electrolyte membrane interposed therebetween; an anode-side conductive separator having a gas flow channel for supply of a fuel gas to said anode; and a cathode-side conductive separator having a gas flow channel for supply of an oxidant gas to said cathode, wherein each of said anode and said cathode comprises at least a catalyst layer in contact with said electrolyte membrane and a gas diffusion layer in contact with said catalyst layer and said separator, and said catalyst layer of said anode and said cathode contains a compound represented by the formula (I):

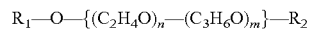

where $R_1$ and $R_2$ independently are hydrogen or alkyl groups having not less than 5 and not more than 15 carbon atoms or a hydrogen atom, n and m are integers which satisfy $0 \leq n \leq 5$, $0 \leq m \leq 5$ and $1 \leq n+m \leq 5$, and when neither n nor m is 0, at least one of said ethylene oxide group and at least one of said propylene oxide group are arranged randomly or are not arranged randomly, wherein said catalyst layer of said anode or said cathode further comprises at least one oxide containing at least one metal selected from the group consisting of silicon, titanium, aluminum, zirconium, magnesium and chromium, and said catalyst layer of said anode or said cathode contains said metal oxide in an amount of 1 to 10,000 ppm with respect to a total of carbon particles carrying catalyst particles thereon and a hydrogen ion conductive polymer electrolyte contained in said catalyst layer of said anode or said cathode.

* * * * *